(12) United States Patent
Grott

(10) Patent No.: US 7,717,173 B2
(45) Date of Patent: May 18, 2010

(54) METHODS OF IMPROVING OIL OR GAS PRODUCTION WITH RECYCLED, INCREASED SODIUM WATER

(75) Inventor: Gerald J. Grott, Phoenix, AZ (US)

(73) Assignee: Ecycling, LLC, Phoenix ( * ) Notice: Subject to any disclaimer, the term of this patent is extended or adjusted under 35 U.S.C. 154(b) by 0 days.

(21) Appl. No.: 11/643,477

(22) Filed: Dec. 21, 2006

(65) Prior Publication Data

US 2007/0102154 A1    May 10, 2007

Related U.S. Application Data

(63) Continuation-in-part of application No. 10/706,341, filed on Nov. 11, 2003, now Pat. No. 7,353,634, which is a continuation of application No. 09/849,453, filed on May 4, 2001, now Pat. No. 6,651,383, which is a continuation-in-part of application No. 09/565,735, filed on May 5, 2000, now Pat. No. 6,374,539, which is a continuation-in-part of application No. 09/110,789, filed on Jul. 6, 1998, now Pat. No. 6,071,411.

(51) Int. Cl.
*E21B 43/00* (2006.01)

(52) U.S. Cl. .................................................. 166/267

(58) Field of Classification Search ................... None
See application file for complete search history.

(56) References Cited

U.S. PATENT DOCUMENTS

| 2,624,654 | A | * | 1/1953 | Hirsch | 423/187 |
| 2,919,898 | A | * | 1/1960 | Marwil et al. | 175/66 |
| 3,467,190 | A | * | 9/1969 | Townsend et al. | 166/252.3 |
| 4,366,063 | A | * | 12/1982 | O'Connor | 210/652 |
| 6,063,737 | A | * | 5/2000 | Haberman et al. | 507/261 |
| 6,666,971 | B2 | * | 12/2003 | Chen | 210/687 |
| 7,455,109 | B2 | * | 11/2008 | Collins | 166/275 |

* cited by examiner

*Primary Examiner*—Zakiya W Bates
*Assistant Examiner*—Angela M DiTrani
(74) *Attorney, Agent, or Firm*—The Luther Law Firm; Finn Simmensen; Barbara J. Luther

(57) ABSTRACT

A method of improving oil or gas well production has the steps of (a) collecting contaminated water having 0.15% or more by weight of the salts of Na, Ca, Mg, K, Cl, $SO_4$ or $CO_3$ or combinations thereof (b) separation processing the contaminated water to produce i.) a first separated liquid product having increased sodium chloride and decreased magnesium chloride and calcium chloride or combinations thereof than the collected water, and ii) a second solid or liquid product having decreased sodium chloride and increased magnesium chloride and calcium chloride or combinations thereof than the collected water, and (c) injecting the first liquid product into an oil or gas well formation to improve production.

7 Claims, 14 Drawing Sheets

METHODS OF IMPROVING OIL OR GAS PRODUCTION WITH RECYCLED, INCREASED SODIUM WATER

RELATED APPLICATIONS

This application is a continuation-in-part application of U.S. application Ser. No. 10/706,341 filed on Nov. 11, 2003, now U.S. Pat. No. 7,353,634 issued Apr. 3, 2008, which is in turn, a continuation application of U.S. application Ser. No. 09/849,453 filed on May 4, 2001 now U.S. Pat. No. 6,651,383 issued Nov. 25, 2003, which is in turn, a continuation-in-part application of U.S. application Ser. No. 09/565,735 filed on May 5, 2000, now U.S. Pat. No. 6,374,539 issued Apr. 23, 2002, which is in turn, a continuation-in-part application of U.S. application Ser. No. 09/110,789 filed on Jul. 6, 1998, now U.S. Pat. No. 6,071,411 issued Jun. 6, 2000.

BACKGROUND OF THE INVENTION

The present invention relates to methods for economic utilization of waste waters produced from water purification processing.

Water purification typically produces a first effluent of relatively "clean water" and a second effluent of "waste water" which include unwanted contaminates. The softening of hard water by the removal of calcium and magnesium is required for both industrial and household use. Known water softening processes proceed either by way of ion-exchange, membrane softening or precipitation. In the ion-exchange process, the calcium ($Ca^{2+}$) and magnesium ($Mg^{2+}$) ions are exchanged for sodium ($Na^+$) and regeneration of the ion-exchange resin is achieved with a large excess of NaCl. This processes creates a regeneration effluent being a relatively concentrated aqueous solution of sodium, calcium and magnesium chlorides which has to be discarded. Consequently, by this method, considerable amounts of sodium, calcium and magnesium salts in solution must be disposed of.

Alternatively, it is possible to use weak acid resins which exchange hydrogen ($H^+$) for calcium ($Ca^{2+}$) and magnesium ($Mg^{2+}$), and to regenerate the spent resins with a mineral acid. While this method creates less waste water, it is more expensive and yields relatively acidic soft water which is corrosive. Meanwhile, membrane softening concentrates the calcium, magnesium salts and salts of other divalent ions to produce waste waters which require costly disposal.

The precipitation process has traditionally been carried out by the "lime soda" process in which lime is added to hard water to convert water soluble calcium bicarbonate into water insoluble calcium carbonate. This process also results in waste water which is difficult to filter and requires cumbersome treatment.

My previously issued patent, U.S. Pat. No. 5,300,123 (which is incorporated herein by reference), relates to the purification of impure solid salts. Even this process produces salty waste water which must be disposed of.

The disposal of waste water has become an expensive problem for society. For example, approximately 1.61 billion gallons of waste water containing approximately 800,000 tons of mixed sodium, calcium, magnesium chlorides and sulfates is produced from water treatment operations and oil fields in the state of California alone. This waste water must be disposed of, costing the state of California millions of dollars each year. Meanwhile, the disposal of waste water has become even more problematic in other parts of the world. As a result, billions of dollars are spent each year toward efforts to dispose of waste waters. Accordingly, it would be highly advantageous to provide improved methods of disposing of salty waste waters. It would even be more advantageous to provide methods of utilizing salty waste waters which provide a benefit to society, instead of simply disposing of the unwanted waste waters.

Wind erosion of soil is also significant problem throughout the world. Due to small particle size and poor cohesion, finely divided soil is sensitive to the influence of wind. Such finely divided soil is found in agricultural lands, dunes, lake beds, construction sites and roads under construction. Erosion by wind causes the drifting of masses of soil in the form of dust. The erosion by wind causes the inconvenience of dust formation and the loss of valuable matter such as seed, fertilizer and plantlets. Dust storms are a danger to traffic and a health risk to persons located in the vicinity.

Moreover, the effects of wind erosion on soil can be enhanced by the influence of the sun and rain. The sun causes the evaporation of moisture from soil thereby reducing the cohesion of finely divided soil. Erosion of the soil by rain is caused by rain washing away soil. This is a particular problem when agricultural soil is washed away, damaging plant life and making the soil unusable for agricultural purposes. Further, due to the influence of erosion by rain, the unprotected slopes of ditches, channels, dunes and roads may collapse or be washed away.

Therefore, it is extremely important to prevent the effects of the sun, wind and water in eroding soil. As used herein, soil stabilization refers to the treatment of soils with chemicals to offset the tendencies of soils to be sensitive to small changes in the types of ions in the soil moisture as they affect the plasticity of the soil. For example, swelled clays, those with layers of "bound" water molecules, are more susceptible to movement under load. Soil stabilization of swelled clays can be effected by altering the types and/or amounts of ions in the soil mixture.

It has been proposed to prevent the shift, drift and erosion of soil by treating the surface layers of the soil with water dispersible high polymeric substances of a natural or synthetic nature. Examples of these high polymeric substances include starch ethers, hydrolyze polyacrylonitril, polyvinyl alcohol and carboxymethyl cellulose. U.S. Pat. No. 3,077,054 discloses the use of polyvinyl acetate as an anti-erosion agent. U.S. Pat. No. 3,224,867 teaches the conditioning of soil with mono starch phosphate. U.S. Pat. No. 5,125,770 teaches treating the soil with a pre-gelatinized starch and a surfactant compound. Furthermore, it has been known to treat dirt roads with relatively pure solid sodium chloride (NaCl), calcium chloride ($CaCl_2$), and mixtures of the two.

There are several drawbacks with the aforementioned soil treating compounds. The polymers mentioned have a relatively high price and have potentially harmful environmental properties. In addition, the starch ethers have proved sensitive to washing out by rain water. As a result, their effectiveness as an anti-erosion agent is severely limited.

An additional problem encountered throughout the world involves fungus. There are millions of acres of land in California, Arizona, New Mexico, Texas and the Sonora and Sinaloa areas of Mexico where crop production is almost impossible due to fungus which attack virtually all dicotyledonous plants of which there are more than 2,000 species. These include cotton, alfalfa and citrus trees. The lack of productivity is due to excessive calcium carbonate in the soil which minimizes swelling to the point that carbon dioxide from decaying humus concentrates to more than about 3.2% $CO_3$, where fungus thrives. These fungi, primarily *Phytomatotrichum omnivorim* (Shear) Duggar, have three stages of development called the mycelium, conidium and scelerotia.

The first stage, referred to as mycelium, involves the development of a fine filament which branches out throughout the soil and forms a tight web around plant roots. After the filament reaches the soil surface, a white mat forms on the surface, referred to as conidium. When mature, the mycelium develops multicellular bodies called scelerotia which can extend to a depth of up to twelve feet into the soil.

About 1970, it was discovered that the addition of sodium to soil offset the excess calcium in the soil. This increased the soil permeability and avoided the build-up of carbon dioxide that permits the root rot to flourish. Sodium chloride has been applied where the soil drains readily and the excess chloride and sodium are leached away by rainfall or irrigation. Meanwhile, sodium sulfate is preferable because 1) the sulfate supplies the nutrient sulfur, 2) the sulfate combines with calcium to form gypsum and gypsum soils typically do not support root rot, 3) gypsum buffers excess sodium assisting its leaching from the soil, and 4) there is no additional chloride residue which can leach into the water table. Unfortunately, sodium sulfate has always been too costly to be used to treat soil for farming. Recently, it has been suggested that solid mixtures of salts removed from water softening processes can be used to control root rot. However, salts removed from water softening are still relatively expensive and the process of utilizing salts recovered from waste water has not been adopted within the agricultural community.

Still an additional problem encountered in agriculture is that soil is often too high in sodium and/or too high in salinity. Farmland and irrigation water is often unacceptably high in sodium. Irrigation waters containing high amounts of sodium salts versus calcium and/or magnesium salts can create a buildup of sodium in the soil. This excess soil results in the dispersion of soil colloidal particles and an increase in soil pH. The dispersion of colloidal particles causes the soil to become hard and compact when dry and increasingly resistant to water infiltration and percolation. The sodium rich soil also becomes resistant to water penetration due to soil swelling when wet.

The total salinity of soil and irrigation water is also of concern. Salinity refers to the total salts within the water, with the significant positive ions (cations) in salinity being calcium, magnesium and sodium and the significant negative ions (anions) being chloride, sulfate and bicarbonate. All irrigation water contains some dissolved salts. When soil has a high content of dissolved salts, or the irrigation waters have sufficient salts to increase the salinity of the soil, the soil has the tendency to hold the water instead of releasing the water for absorption by plant roots by osmotic pressure. Even if the soil contains plenty of moisture, plants will wilt because they cannot absorb necessary water.

Ironically, though there is an overabundance of waste waters that are contaminated with the salts of Na, K, Ca, Mg, Fe, Cl, $SO_4$, and $CO_3$ that, as discussed above, are extraordinarily expense to dispose of, millions of dollars are spent each year on salts such as sodium chloride for deicing highways. It would thus be advantageous if the salts in waste water could be used for deicing highways.

It would also be highly desirable to provide a method for treating soil that is of low cost and utilizes a material or compound which is readily available. It would be even more advantageous if salty waste waters could be used to treat soil to control dust and effect soil stabilization.

It would also be desirable to provide a method inhibiting root rot in soil.

Moreover, it would be desirable to provide a method of maintaining the proper salinity levels and salinity equilibrium in soil to enhance the agricultural properties of soil.

Furthermore, it would be desirable to provide a method of disposing of waste water produced from oil well drilling while simultaneously providing products useful for oil field applications.

Finally, it would be desirable if all of the aforementioned objectives could be accomplished while overcoming an expensive and problematic concern facing this country and the rest of the world, the disposal of waste waters.

SUMMARY OF THE INVENTION

Briefly, in accordance with the invention, I provide methods for economically and efficiently utilizing the waste waters produced by water purification and particularly those produced from oil and gas wells, and irrigation drainage. To this end, my invention is so successful, the effluents produced from water purification should no longer be referred to as "waste" waters at all.

I have learned that by applying the waste water from water purification, such as water softening processes, upon soil provides an excellent means for controlling dust from wind blown soil and for effecting soil stabilization. More particularly, I have learned that the direct application of the salty waste waters from water purification and water softening processes is effective in treating industrial clays; controlling dust; stabilizing load bearing soils such as foundations, road beds, etc. I have also learned that the direct application of waste waters to soil can be applied in similar manner to seal soil surfaces for pond sealing.

The waste waters of the present invention are any waters which are produced as a result of the purification of water, and particularly purified "oil field produced waters" and irrigation drainage, which results in a first effluent of clean water and a second effluent of a waste water, which typically must be disposed of. As defined herein, clean water refers to water which has been treated by one or several methods for public or industrial use. For example, in the drinking water industry, clean water is the final delivered water. Typical water purification processes and water softening processes of the present invention include reverse osmosis, electro dialysis, distillation, evaporation, ion exchange and lime softening. These processes create waste water having various levels of salt content. For the purposes of this invention, I define "waste water" as water containing about 0.15% or more by weight of the salts of Na, K, Ca, Mg, Fe, Cl, $SO_4$, and $CO_3$ or a combination thereof. Prior to the practice of my invention, the waste water from any of these processes was expensive to dispose of.

I have also learned that waste waters produced from water purification, particularly those high in calcium, magnesium, iron and sulfates, can also be used to control dust and to irrigate farm land, or as additive to irrigation waters, where the soil has a high sodium content.

In addition, I have discovered that, conversely, waste waters which have a high sodium content are particularly suitable for soil stabilization, pond sealing and treating root rot. These high sodium waste waters are also suitable for use in cooling towers and laundry applications.

Moreover, I have discovered that waste waters can be processed to create both solid and aqueous mixtures which can be applied to roads and highways for deicing and for reducing the tendency of water to form into ice on roads and highways.

The waste water may be applied to the soil by any means commonly known in the art. For example, the waste water may be applied by spraying from the back of a truck or other type of construction or farm equipment. In addition, the waste water may be applied to the soil by slow moving aircraft.

Still an additional application of the present invention includes the processing of waste waters to produce products which are usable within the oil industry. More particularly, I have discovered that the water softening of waste waters produced from oil field operation produces two effluents both of which can be used for oil field applications. For practicing this embodiment of the invention, preferably the waste water is analyzed to confirm that it is free of hazardous materials, such as heavy metals. The waste water is then water softened to produce a first "clean" effluent having increased sodium and potassium and a second regenerate effluent having increased calcium and magnesium. Because oil field waste waters tend to have substantially high salt contents, even the "clean" effluent will typically have a salt content of 0.15% by weight or more of salt. Accordingly, the clean water would ordinarily be too salty for use and would have to be disposed of. However, in accordance with the invention, the first effluent from water softening is used as: 1) a weighting agent for drilling muds, 2) as an additive for cement for fabricating oil well casings, and 3) for injection into an oil well drill site formation for maintaining fluid pressure in a process called "water flooding". I have also discovered that the regenerate brine, typically having a salt content of 3.0% or greater, is also useful as a weighting agent for drilling muds.

Accordingly, it is an object of the invention to provide cost effective means of disposing of waste water produced from the purification of water. To this end, it is a principal object of the invention to provide new methods for utilizing waste water produced from water purification.

It is an additional object of the present invention to provide new methods for stabilizing soil and controlling dust from soil.

It is still another object of the present invention to provide new methods for treating soil to reduce root rot in soil to provide previously unusable land for farming.

Furthermore, it is an object of the present invention to provide new methods for irrigating soil to provide proper sodium and salinity levels for agriculture.

In addition, it is an object of the present invention to provide to methods for providing solid and liquid mixtures for deicing roads and highways.

Moreover, it is an object of the present invention to provide to methods for treating waste water produced from oil fields to produce products capable of use in the oil industry.

These and other, further and more specific objects and advantages of the invention will be apparent to those skilled in the art from the following detailed description taken in conjunction with the drawings.

DETAILED DESCRIPTION OF THE PREFERRED EMBODIMENTS

Figure 1:
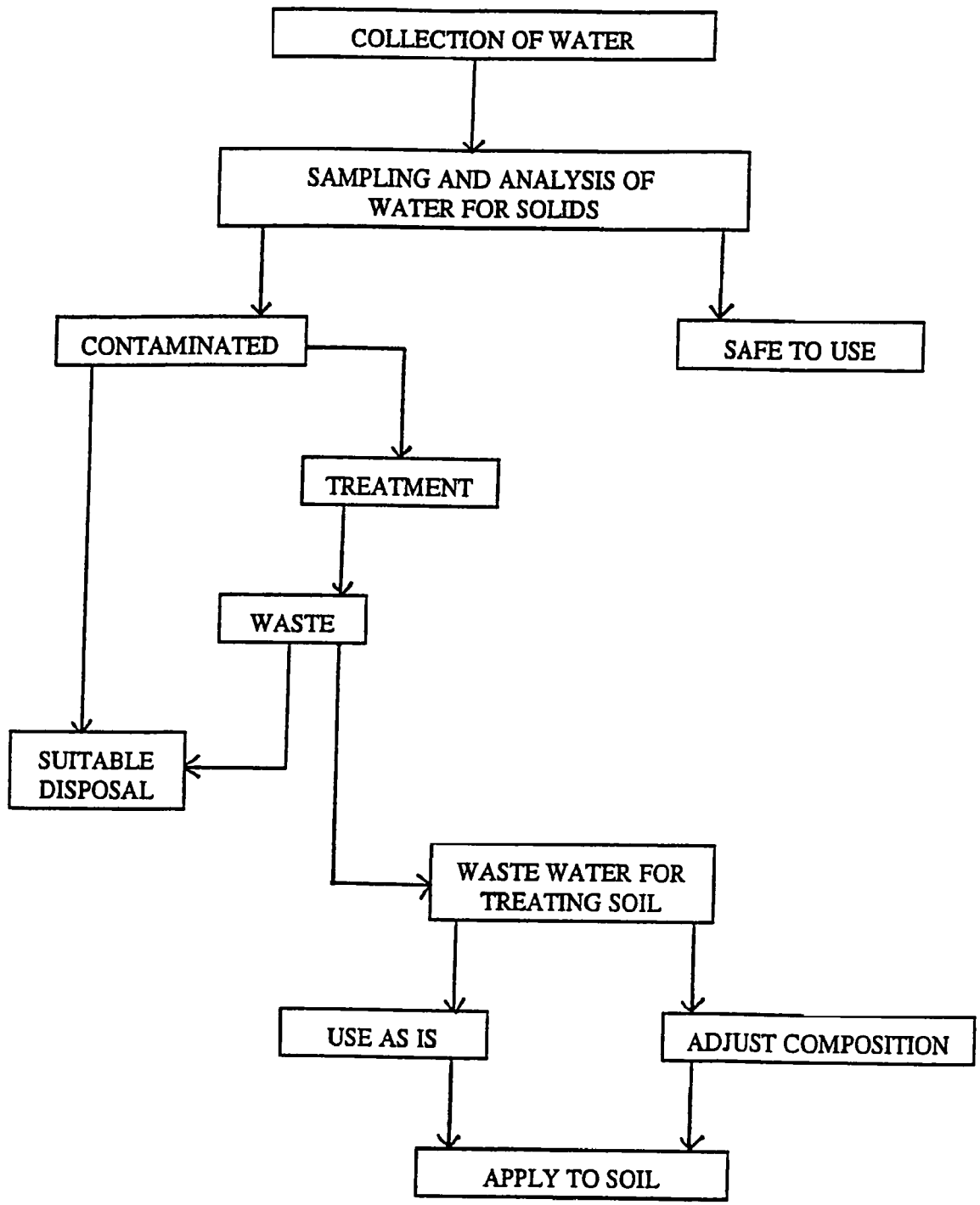
FIG. 1 is a flow chart of the preferred method of the invention.

While the present invention is susceptible of embodiment in various forms, as shown in the drawings, hereinafter will be described the presently preferred embodiments of the invention with the understanding that the present disclosure is to be considered as an exemplification of the invention and it is not intended to limit the invention to the specific embodiments illustrated.

Water softening is the removal of the "hardness" from the water which means predominantly removing or altering the calcium and magnesium ions from the water. These calcium and magnesium ions combined with carbonates, sulfates, oils and fat to create bathtub scum, spotted dishes, gray sheets, etc. In addition, unsoftened water has been found to cause scaling of industrial water heaters and commercial boilers causing early substantial energy losses through impaired heat transfer and early shutdown for the removal of scale. Several methods for effecting water softening are known. The best known process for softening water is "ion-exchange". Ion-exchange entails the exchange of sodium, which is introduced into water, for calcium, magnesium, iron and other divalent mineral ions which are transferred out of the water and into a resin. When the resin approaches saturation with these hard ions, the resin is regenerated most often with solutions of sodium chloride leaving an effluent containing 3 to 25% sodium, calcium and magnesium salts which must be disposed of. The exact concentration of the effluent depends on the shop practice and, in particular, on the amount of rinse water included in the effluent, if any. Less often mineral acids like sulfuric acid or hydrochloric acid are used for water softening and these also produce effluents. Conversely, reverse water softening also involves ion exchange in which calcium and magnesium into the water to separate sodium.

Membrane systems have recently become economically feasible. These systems, such as electro dialysis and reverse osmosis, include the use of a membrane which also produces a salty effluent. For critical uses such as electronics, and particularly for use in the manufacture of computer chips, the first product of clean water may be further purified by dual bed or mixed bed ion-exchange treatment. This "polishing treatment" also produces an effluent containing the removed salts.

Each of these water purifying processes produces a clean water effluent and a waste water effluent which is expensive and difficult to dispose of. Moreover, in U.S. Pat. No. 5,300,123, I disclose a method for reducing the soluble and insoluble impurity levels in salt. In the practice of this invention, salt crystals are initially reduced in size by fine grinding of the crystal mass. The ground crystal mass is then added to a substantially saturated solution of salt and the strain induced in fine grinding process causes them to dissolve in the substantially saturated solution to the extent that the solution becomes supersaturated and new purified crystals form and grow. This dissolving and reforming is continued until substantially all of the original finely ground particles of salt have dissolved and reformed as new purified crystals. The new purified crystals are separated by size from the solution and rinsed, while the fine insoluble impurities which do not grow appreciably, if at all, remain in the now impure solution of sodium, calcium and magnesium chlorides, along with minor impurities from the original waste salt.

I have learned that the waste water produced from water purification and water softening processes, and the calcium and magnesium substantially saturated solution produced in practicing my invention disclosed in U.S. Pat. No. 5,300,123, can be effectively used as soil amendments to control dust and effect soil stabilization. The chemical and physical properties of clays and soils have ion-exchange properties which are determined in great part by their contact with water soluble chemicals. Chemicals having particular influence on the physical properties of soil are sodium, potassium, calcium and magnesium because these are common cations. The most common anions found in soils are chloride, sulfate, carbonate and bicarbonate. The concentration, and relative concentration, of the various dissolved ions determine the activity of the exchangeable ions attached to soil particles. Thus, it is possible to alter and regulate the behavior of soils by controlling the ratio and amount of the various ions applied to the soils.

More particularly, I have found that waste waters having increased sodium or potassium have much greater effectiveness in stabilizing soils than the calcium and magnesium salts. Moreover, I have discovered that waste waters high in sodium are also effective to control root rot.

Conversely, I have found that the calcium and magnesium chlorides in waste waters have much greater effectiveness in controlling dust from wind blown soil than the sodium salts. I have also found that, in general, the calcium and magnesium salts do not noticeably interfere with the sodium chloride's ability to stabilize soils, while the sodium salts do not reduce the effectiveness of calcium and magnesium chlorides for dust control. Moreover, the calcium and magnesium salts are effective for irrigating farm land, particularly where the sodium absorption ration needs to be adjusted.

For the purposes of this invention, "waste water" is defined as any water containing sufficient salts as to have no acceptable use due to costs or contamination levels. In general, waste water containing about 0.15% or more by weight of the salts of Na, K, Ca, Mg, Fe, Cl, $SO_4$, and $CO_3$, or combinations thereof are considered as having no acceptable use and must be disposed of.

With reference to FIG. 1, in a preferred embodiment, water is collected which is contaminated with salts including Na, K, Ca, Mg, Fe, Cl, $SO_4$ and $CO_3$. The contaminated water is purified by any means known to those skilled in the art, including distillation, reverse osmosis, electrolysis, evaporation, ion exchange, etc. The contaminated water is processed to produce a first effluent of relatively clean water which is useful for agricultural purposes, drinking water, industrial purposes, etc. The processing also produces a second effluent of waste water. The waste water is analyzed for hazardous materials to confirm that the waste water is safe to use. Thereafter, the waste water, comprising an aqueous solution of salts, is analyzed for individual amounts of sodium, calcium, and magnesium and total dissolved solids to determine the best application and the amount of solution to be applied to a particular soil. The waste water is then applied to soil by spraying from a truck, aircraft or the like to effectively control dust and/or stabilize the soil. Where the concentration of salts is not enough to meet the required needs in a single application, several applications of the waste water may be employed.

Figure 2:
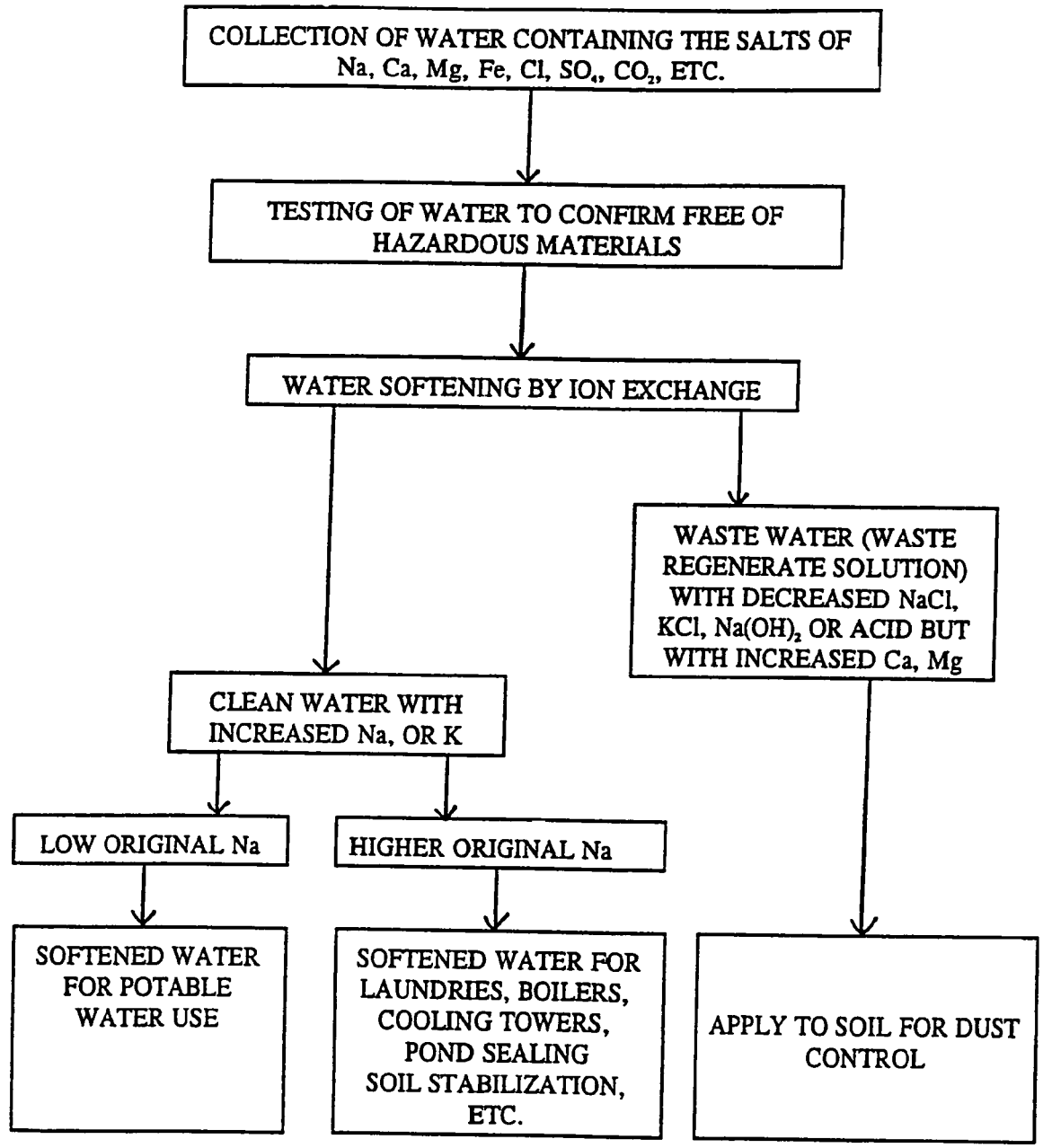
FIG. 2 is a flow chart of another preferred method of the invention.

With reference to FIG. 2, in a second preferred embodiment, water is collected which is contaminated with the salts of Na, Ca, Mg, Fe, Cl, $SO_4$, and $CO_3$. The water is then tested to confirm that it is free of hazardous materials. The contaminated water is then purified by ion exchange. As the name implies, the amount of salts in the effluents does not change. However, the cations are exchanged. By this process, a first effluent of clean water is produced having an increase in sodium or potassium. Where the contaminated water originally contained a low amount of sodium, it is preferred that this water be used for potable water. Meanwhile, where the contaminated water originally contained high sodium amounts, it is preferred that the clean water effluent be used for laundries, boilers, cooling towers, pond sealing and soil stabilization. These applications are typically more tolerant of waters having high sodium content, as long as the magnesium and calcium content remains low. These uses are listed in order of suitability as the sodium increases. As shown in FIG. 2, the water softening process by ion exchange also produces a waste water having decreased NaCl, KCl, $Na(OH)_2$ or acid, but having an increase in calcium and magnesium. For application of the present invention, this waste water is then applied to soil by spraying from a truck, aircraft or the like to control dust.

Figure 3:
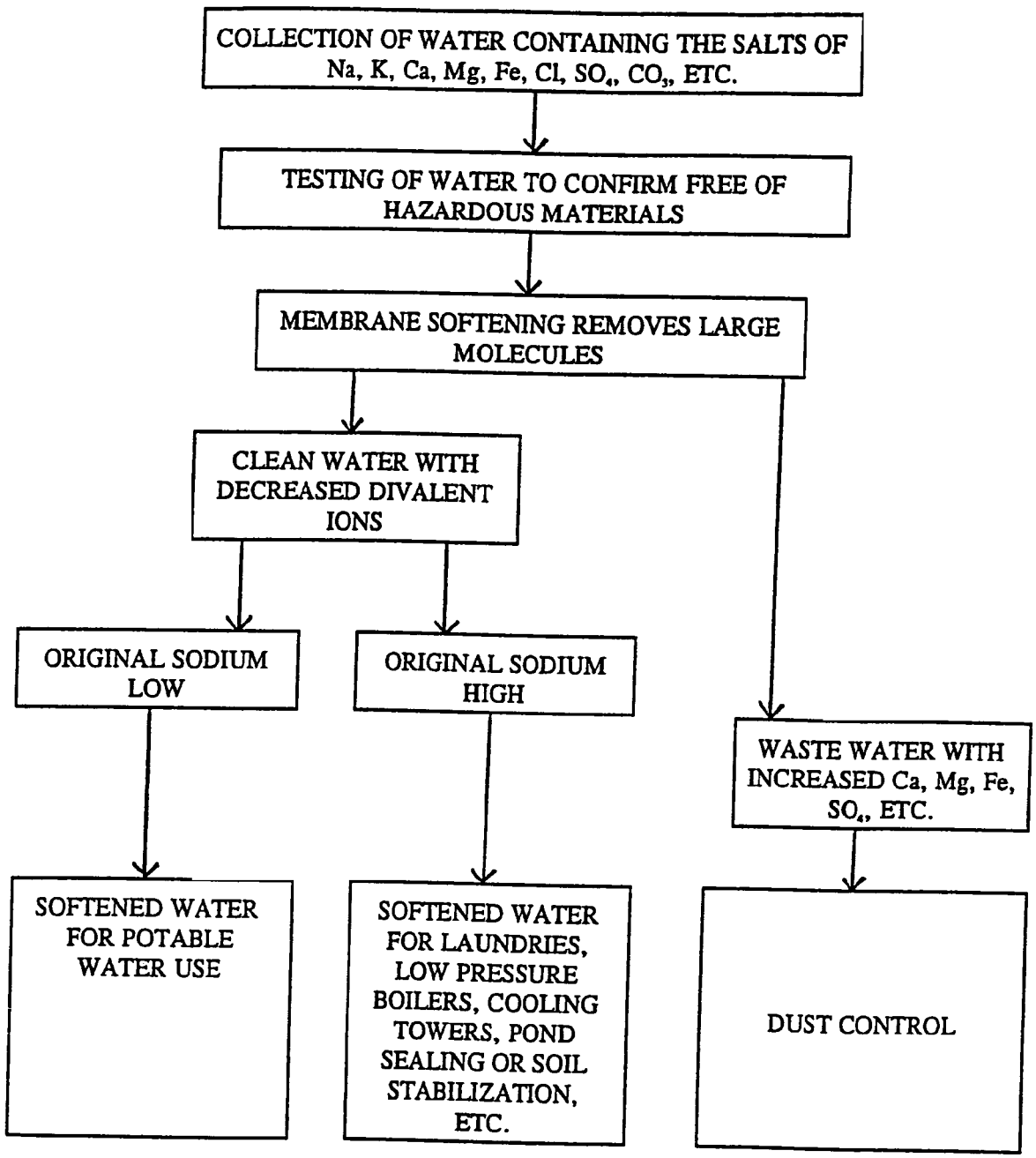
FIG. 3 is a flow chart of still another preferred method of the invention.

With reference to FIG. 3, in a fourth preferred embodiment, water is collected which is contaminated with the salts of Na, K, Ca, Mg, Fe, Cl, $SO_4$, and $CO_3$. The water is then tested to confirm that it is free of hazardous materials. This contaminated water is then purified by a membrane system to remove large molecules. A first effluent of clean water having decreased multivalent ions is produced from the membrane softening process. Where the original sodium content of the contaminated water is relatively low, it is preferred that the clean water be used for potable water. Where the original sodium content of the contaminated water is relatively high, it is preferred that the clean water effluent be used for laundries, low pressure boilers, cooling towers, pond sealing and soil stabilization. The membrane system also creates a waste water having significant calcium, magnesium, iron, sulfates, etc. For application of the present invention, it is preferred that this waste water be applied to soil by spraying from a truck, aircraft, or the like to effectively control dust.

Figure 4:
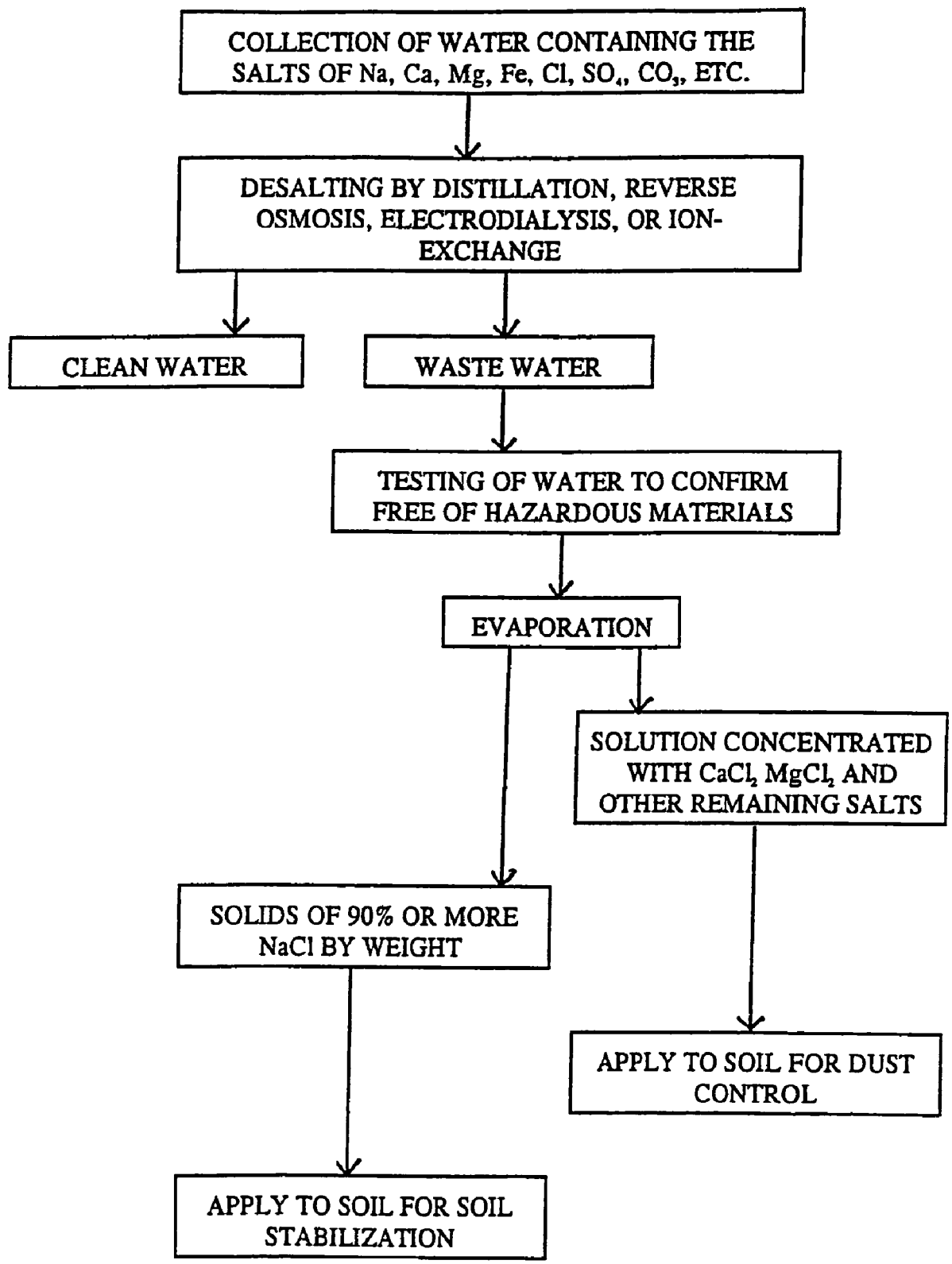
FIG. 4 is a flow chart of a preferred method of the present invention including evaporation to produce substantially solid sodium chloride.

As shown in FIG. 4, in a fourth embodiment of my invention, water contaminated with the salts of Na, K, Ca, Mg, Fe, Cl, $SO_4$, and $CO_3$ is collected. The contaminated water is desalted to produce a first effluent of relatively clean water, and a second effluent of waste water. The second effluent of waste water undergoes further evaporation processing to produce a first product of 90% or more NaCl, and a third effluent solution of substantially saturated $CaCl_2$ and $MgCl_2$. For practice of the invention, the NaCl is then applied to soil to effect soil stabilization. Meanwhile the third effluent solution of mixed $CaCl_2$ and $MgCl_2$ is applied to soil to effect dust control.

As would be understood by those skilled in the art, the preferred amount of water and the percentage of salts contained therein to control dust and effect soil stabilization will vary greatly. Factors which will affect waste water applications include the chemical composition of the soil, the moisture in the soil, humidity, local rainfall, traffic conditions, etc.

Since the testing of soil is expensive, it is preferred that the waste water be applied in several applications. Waste water is applied and allowed to evaporate. The soil is examined to determine if sufficient waste water has been applied to control dust or stabilize the soil. These steps are repeated until sufficient salts have been applied to control dust or to stabilize the soil.

The embodiments described above will now be further explained in and by the following examples.

EXAMPLE 1

Approximately 2.7 miles of road in the Mojave Desert of California is treated with waste water containing approximately 12.5% total salts, and in particular, about 1.37% calcium chloride, 0.39% magnesium chloride and 10.7% sodium chloride. After treatment, the road underwent periodic truck traffic. Visual comparison of dust produced by truck traffic is measured against a section of road which has not been treated. Following a rain, dust starts to be visible from a one mile distance within 2-4 days for the untreated road, while dust starts to be visible from the one mile distance within 10-20 days for the treated section of road.

Thereafter, waste water applications are increased for a three month period. The amount per application is the maximum that the soil will absorb without turning muddy. Then, the applications are ceased. The road is examined over the next year and found not to exhibit any significant dusting. In addition, there is a distinct reduction of washboarding.

EXAMPLE 2

Approximately one mile of dirt road in the Mojave Desert is treated with a mixture of sodium, calcium and magnesium salts. Application of the untreated waste water proves effective for soil stabilization. Compared to untreated sections of the dirt road, the soil is found to be more stable and less prone to being spread by rainfall, and is found to be much less prone to washboarding and potholing.

Figure 5:
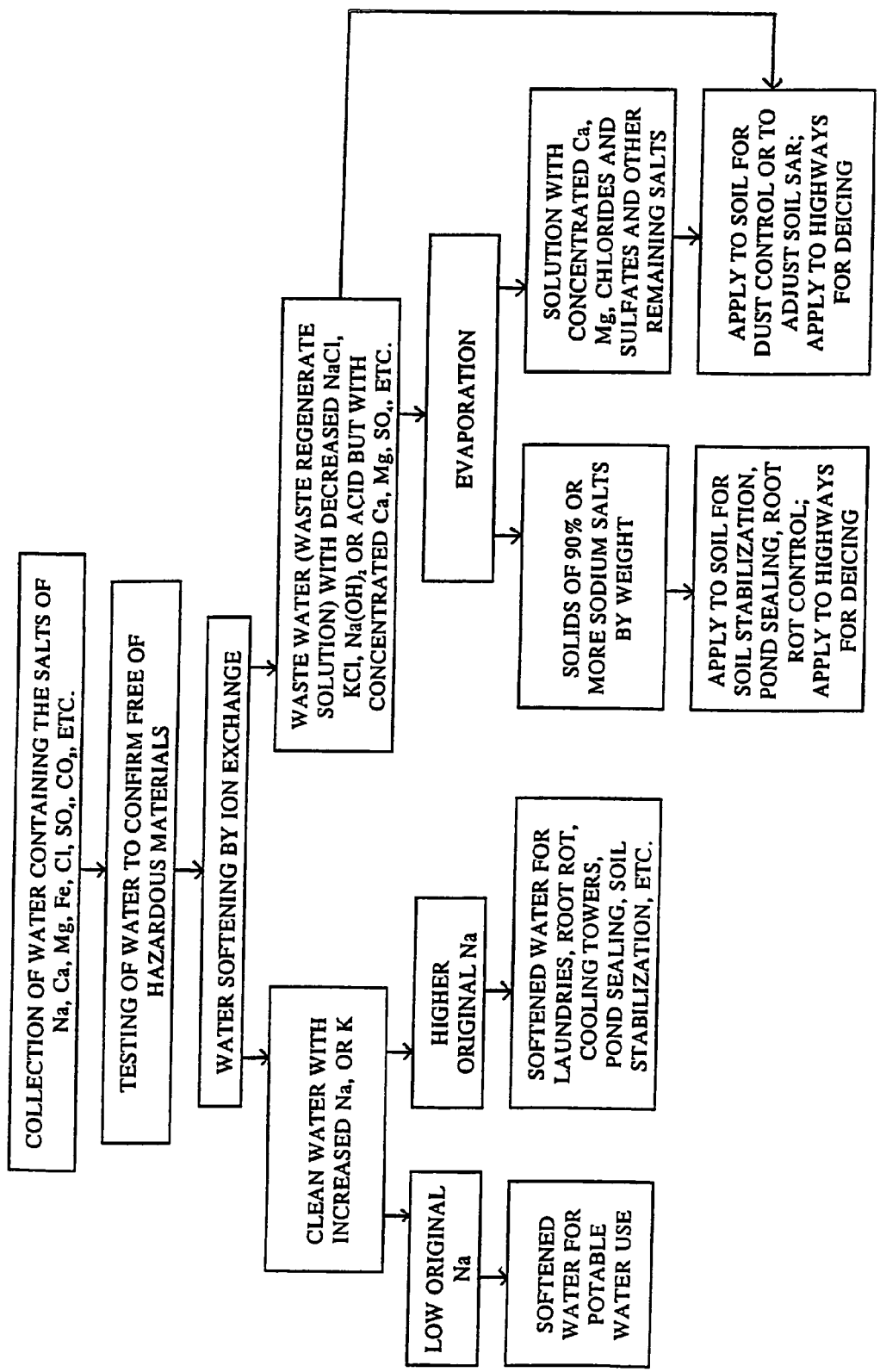
FIG. 5 is a flow chart illustrating a method of the present invention for applying softened waters for laundries, root rot, cooling towers, pond sealing and soil stabilization, and for applying waste waters for dust control and agriculture.

With reference to FIG. 5, in a fifth preferred embodiment of the present invention, water is collected which is contaminated with the salts of Na, K, Ca, Mg, Fe, Cl, $SO_4$, and/or $CO_3$. The contaminated water is then tested to determine that it is free of hazardous chemicals, and if the water is determined to sufficiently free of hazardous chemicals, the water is purified by water softening, such as by ion exchange. As shown, ion exchange produces an first effluent of clean water which typically has a high sodium content. As explained with reference to FIG. 2, where the clean water has a low sodium content such as where the original contaminated water had a low sodium content, the water may be used for potable applications. Meanwhile, where the clean water has a high sodium content, the clean water may used for laundry applications, cooling towers, pond sealing and soil stabilization. The clean water having a high sodium content may also be applied to soil to inhibit root rot. The added sodium counterbalances any excess calcium in the soil to increase soil permeability and inhibit the buildup of carbon dioxide in the soil. Without the carbon dioxide in the soil, the root rot fungus either dies, or at least its growth is inhibited.

Still with reference to FIG. 5, the waste water produced by ion exchange typically has an increased level of calcium and magnesium. This waste water may be applied to soil to control excess soil dusting. In the alternative, where the soil at issue requires soil stabilization, pond sealing or root rot control, the waste water undergoes evaporation to produce solid NaCl which can be applied to the soil. Moreover, I have found that the waste water can be processed through evaporation, or in accordance with the methods disclosed in my U.S. Pat. No. 5,300,123, to produce substantially solid sodium salt which can be applied to roads to lower the freezing point of water on the roads. Meanwhile, the waste water having an increased level of calcium and magnesium can be applied directly to the soil, or concentrated through evaporation and then applied to soil, for irrigation purposes and for adjusting the soil's sodium absorption ratio (SAR). In addition, even though the calcium and magnesium solution is typically aqueous, it can also be applied to roads and highways to inhibit the formation of ice on the roads as calcium and magnesium salts also lower the freezing point of water. Thus, any water previously on the road will freeze at a lower temperature once mixed with the calcium and magnesium solution which has been produced as a result of evaporating the waste water.

Figure 8:
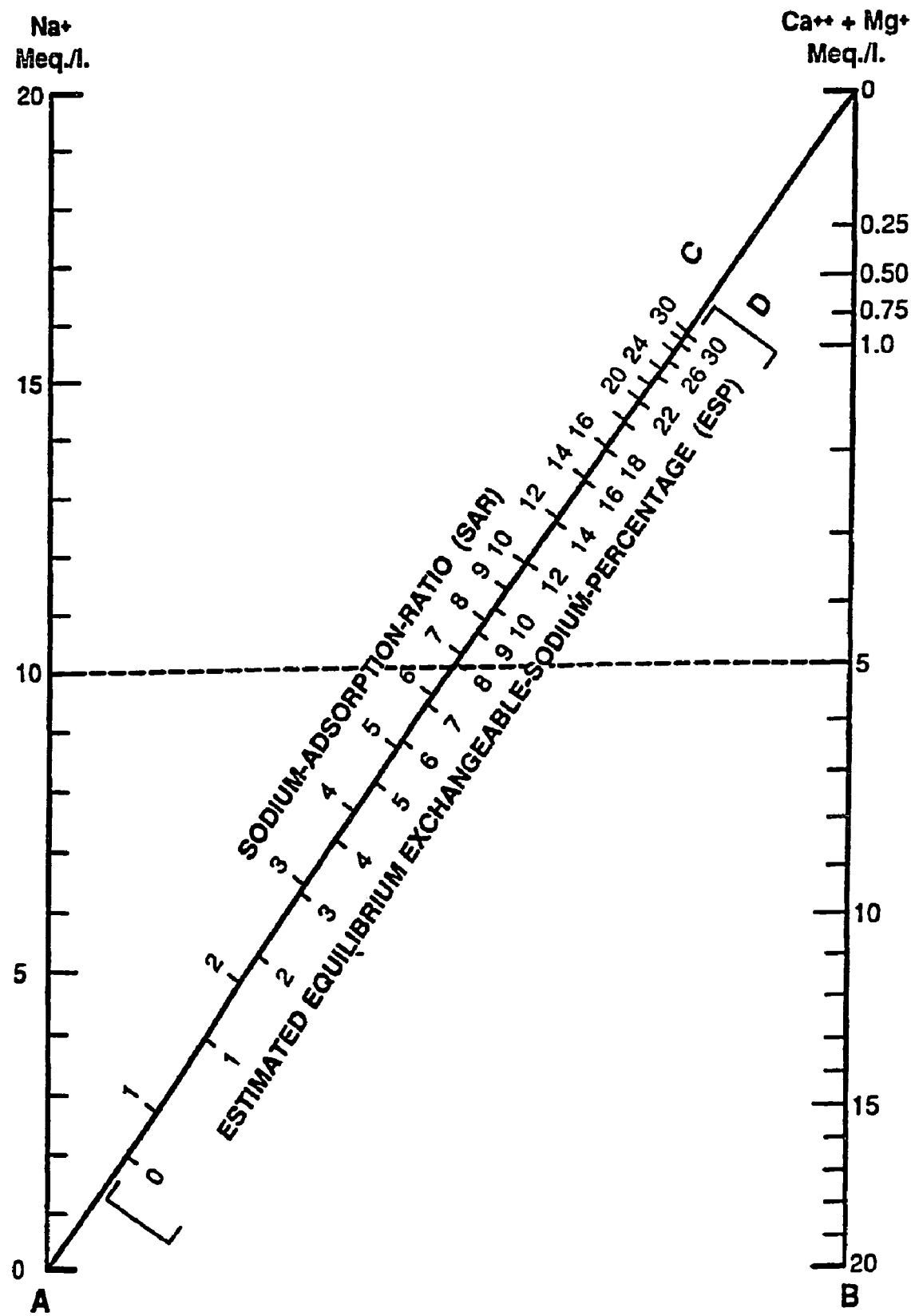
FIG. 8 is a chart illustrating the sodium absorption ratio (SAR) of irrigation waters.

All irrigated areas suffer from a buildup of sodium. Plant evapotranspiration and plant growth use about 70 to 90% of the irrigation water and the sodium is concentrated in the remaining 10 to 30% of the water. This water must be washed from the roots or plant growth suffers. As shown in FIG. 8, the sodium buildup is predicted by the sodium absorption ratio (SAR) vs. the total of salinity of the irrigation water. To use the chart in FIG. 8, the sodium concentration is marked on the left side of the nomogram. The calcium plus magnesium concentration is then marked on the right side of the nomogram. Drawing a straight line between the two marks identifies the SAR value where the line intersects the sodium adsorption scale. Due to the inverse relationship between the addition of sodium to calcium and magnesium, an increase in calcium and/or magnesium will actually lower the SAR value of the irrigation water. With reference again to FIG. 5, using the waste waters having a high calcium and magnesium content as irrigation water reduces the buildup of exchangeable sodium in the soil thereby maintaining the soil in proper sodium equilibrium.

Figure 6:
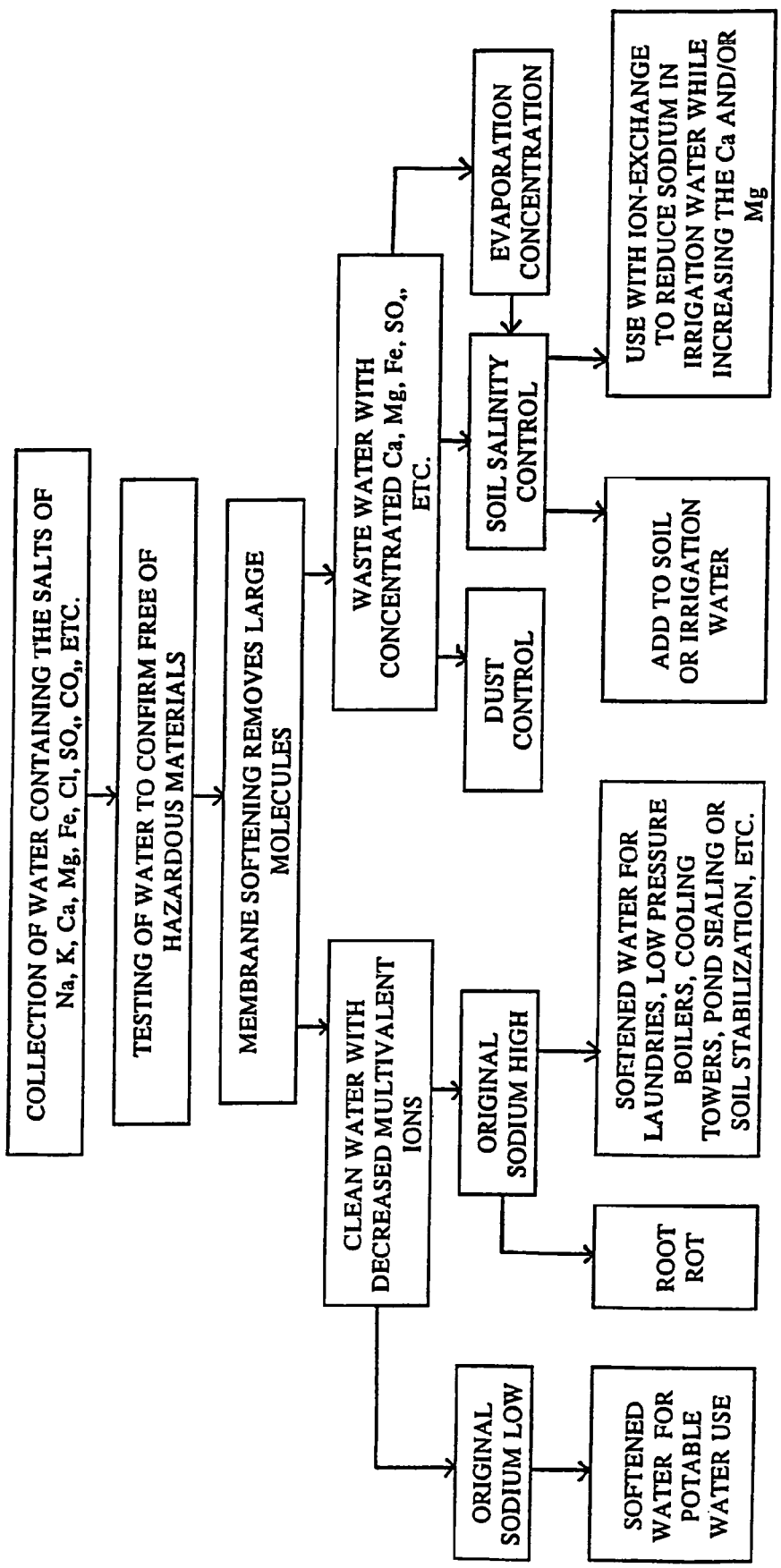
FIG. 6 is a flow chart illustrating a practice of the present invention including membrane softening to produce waste water for application to control dust, control soil salinity or irrigate soil.

With reference to FIG. 6, membrane softening also creates a first effluent of clean water and a second effluent of waste water. For practicing the present invention, the clean water is utilized for potable applications where the sodium is low, but used for laundry, low pressure boilers, cooling towers, pond sealing soil stabilization or treating root rot where the sodium is high. Meanwhile, the waste water from membrane softening typically has significant levels of calcium and magnesium. As discussed above, instead of simply disposing of these waters, it is preferred that these waste waters be used for dust control or for controlling the sodium level in the soil. As shown in FIG. 6, controlling the level of the sodium in the soil can be accomplished in one of two ways. The waste water can be applied directly to the soil to adjust the SAR, or the waste waters can be used in cooperation with ion exchange water softening processing to reduce the amount of sodium in irrigation waters. These irrigation waters, now lower in sodium, are applied to the soil to maintain the soil's sodium equilibrium level, or to leach out sodium from the soil to place the soil into a proper sodium equilibrium level.

Figure 7:
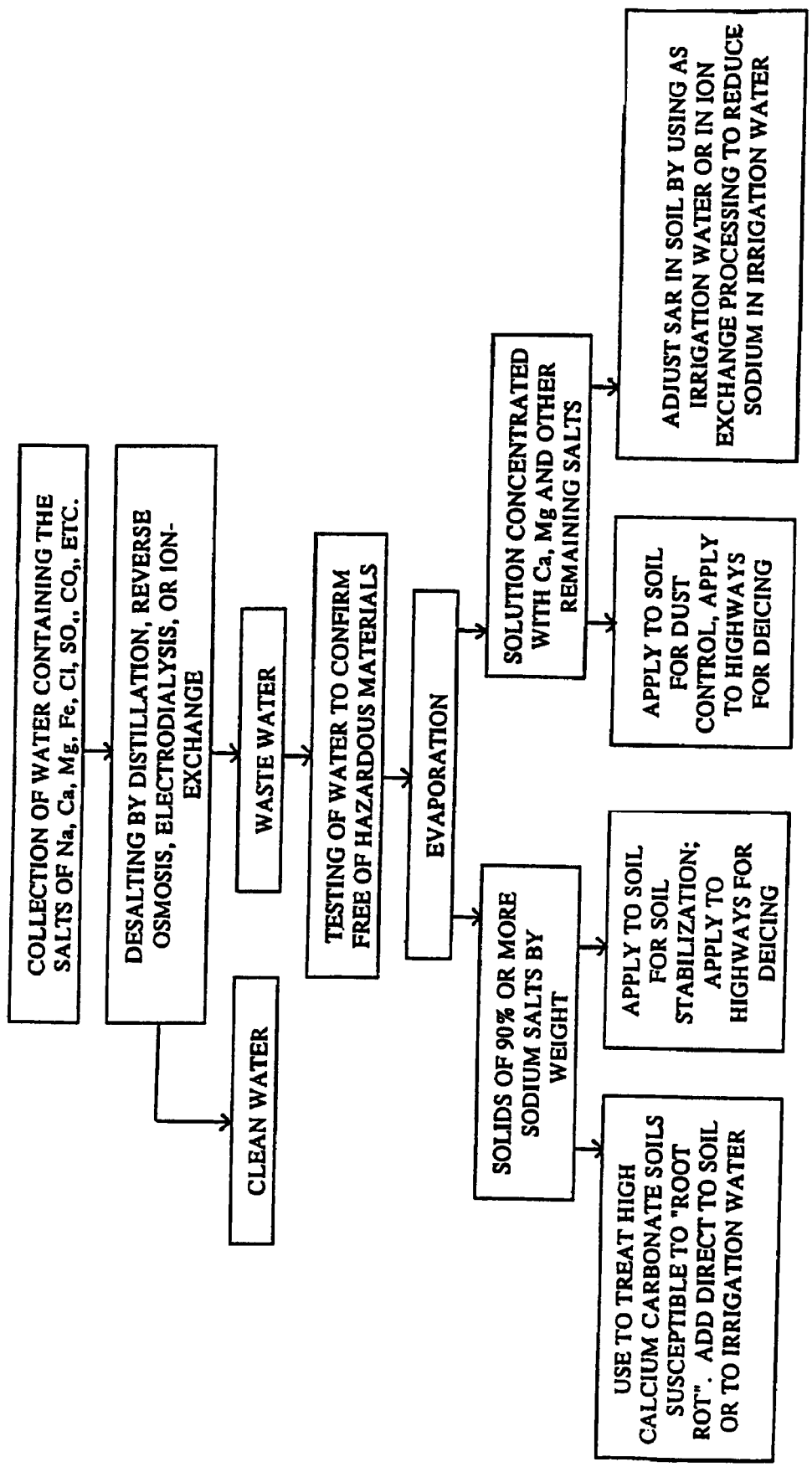
FIG. 7 is a flow chart illustrating a practice of the present invention including water purification to produce waste water for application to control dust and irrigate soil.

With reference to FIG. 7, for practicing an additional embodiment of the present invention, water that is contaminated with the salts of Na, K, Ca, Mg, Fe, Cl, $SO_4$, and $CO_3$ is desalted by distillation, reverse osmosis, electrodialysis or ion exchange to produce a first effluent of clean water and a second effluent of waste water. The waste water is preferably tested to ensure that it is free of hazardous materials. In a preferred practice of the present invention, the water undergoes evaporation to produce a substantially solid mixture and a solution concentrate. The substantially solid mixture is comprised primarily of sodium salts and is thus suitable for use as a soil stabilizer or for inhibiting root rot by directly applying the solid mixture to soil, or by adding the mixture to irrigation water. Moreover, for practicing the present invention, the solid mixture of sodium salts is also applied to roads and highways for deicing and for impeding the formation of ice on the roads and highways.

Meanwhile, evaporation concentrates the waste water to produce an aqueous concentrate of calcium and magnesium salts. The concentrated solution is applied to soil to reduce soil dusting or is applied to soil to adjust the soil's sodium adsorption rate. As described with reference to FIG. 6, the concentrate may be applied directly to soil or may be used to reduce the sodium content in the irrigation water through additional ion exchange processing. In the alternative, the concentrated solution of calcium and magnesium salts is applied to roads and highways for deicing and for impeding the formation of ice on the roads and highways.

Figure 9:
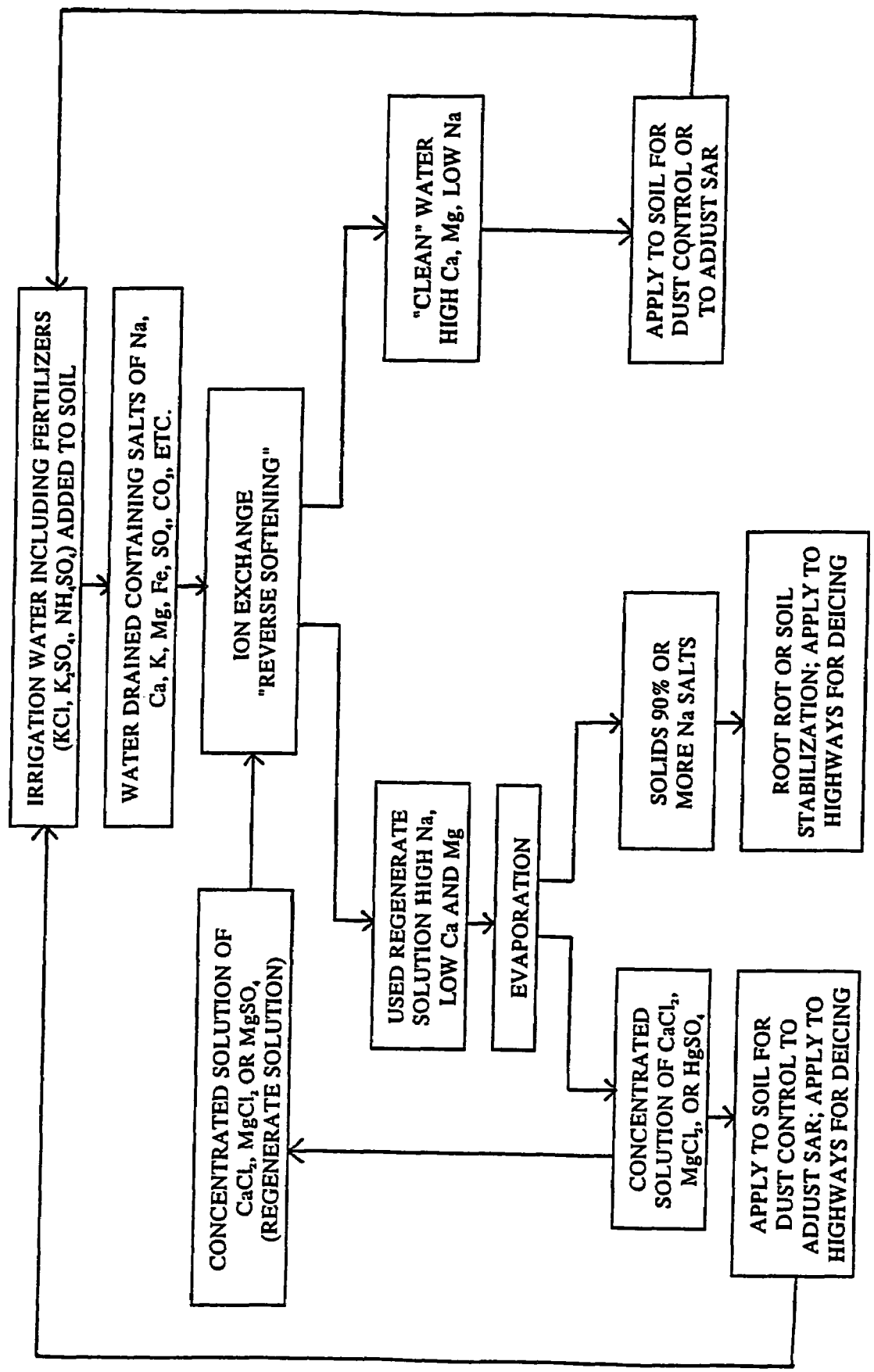
FIG. 9 is a flow chart illustrating a practice of the present invention including a closed loop system for treating soil.

With reference to FIG. 9, in still an additional embodiment of the present invention, a substantially closed loop system is provided for adjusting the properties of soil. As reflected in FIG. 9, farmers typically irrigate the soil while simultaneously adding to the soil significant levels of potassium chloride, potassium sulfate and ammonium sulfate as fertilizer. Over time, the addition of these fertilizers typically introduces substantial salts to the soil which must be leached out of the soil or drained from the soil such as by using pumps to maintain the soil at optimal conditions for agriculture. For practicing a preferred method of the present invention, the water drained from the soil is purified, such as by ion exchange reverse softening. For reverse softening, a solution of calcium chlorides, magnesium chlorides, and/or magnesium sulfates is prepared to create a regenerative solution, such as can be obtained as shown in FIG. 5. The reverse softening process produces a used regenerate solution having increased sodium but with reduced calcium and magnesium. The regenerate solution preferably undergoes evaporative processing producing a 90% solid mixture of sodium salts which is preferably used for treating root rot or for soil stabilization, depending on the properties of the soil at issue. Meanwhile, the evaporative process also creates a concentrated solution of calcium and magnesium salts. Where the soil suffers from dusting or requires adjustment of the soil's sodium adsorption rate, instead of applying the 90% solid mixture of sodium salts, this concentrated solution of calcium and magnesium salts is applied to the soil to reduce these problems. Still with reference to FIG. 9, the ion exchange process also creates a "clean" water effluent typically low in sodium salts but high in calcium and magnesium salts. Where the soil suffers from problems such as dust control or an improper sodium adsorption rate, as opposed to root rot or soil stabilization, this clean water effluent can also be applied to the soil to reduce these problems. The aforementioned process, thus, provides a substantially closed loop procedure for maintaining soil at desired equilibrium levels, notwithstanding that the soil may suffer from wildly divergent chemical problems.

Application to Oil Industry

It has also been discovered that the products produced from water separation processing of waste waters have extensive application in the drilling industry. The water separation processes include, but are not limited to, ion exchange, membrane separation, electro-dialysis, evaporation, precipitation, known "salting out" processes, etc. The water separation processes are believed to have particular usefulness for oil and gas drilling, and accordingly, the following is described with particular emphasis to oil and gas drilling. However, the water separation processes of the present invention has broad application throughout various drilling industries including for use with wells drilled for water, carbon dioxide, nitrogen, natural gas, and oil.

Contaminants not ordinarily found in other waste waster waters are common in produced waters from oil and gas wells. Waste water from oil and gas wells most often contains metals in higher amounts than in waste waters from other sources. The high volume uses of waters such as for water flooding and the use of formulated solutions for Enhanced Oil and/or Gas Recovery have further restrictions on those cations like calcium and magnesium and the anions like bicarbonate, carbonate and sulfate that can combine to form solids that hinder oil and/or gas recovery, particularly at temperatures of 300° F. and higher. The challenges for recycling are such that a report from Department of Petroleum Engineering, Texas A&, states that of the 390 million gallons per day of excess produced water in the Permian Basin, only 1% is re-used and the remaining 350,000,000 gallons per day goes to disposal using re-injection wells. It would be highly beneficial if useful water and materials could be recovered from these waters.

Despite the above described challenges, it has been discovered that the products from purification of waste waters, including waste waters produced from oil and gas wells themselves, have extensive applications in the oil recovery industry as well as the applications in foundation soils and agricultural soils. It has also been discovered that where the oil or natural gas is produced from deeper formations there is often enough heat available from the produced water, oil, and/or natural gas to materially improve the efficiency and the economics of recycling as compared with disposal as wastes. Additionally, the remote locations of many oil and gas resources adds premium value to local recycling by minimizing the energy use and time delays in transportation of materials to the drill site or production area and the costs associated with waste disposal without damaging the ecology. One geographical example for recycling is the use of centralized drilling areas and drilling platforms where first drilled wells may be producing waste water even while other wells are being drilled. In addition to the waste waters from the producing wells there are waste waters from the purification of local brackish water or seawater for potable and uses and, except for hazardous wastes, much or even all of these saline waste waters may be recycled instead of being discharged to waste disposal.

Described in general terms with reference to FIGS. 10-14, an embodiment of the present invention includes collecting the initial contaminated water having 0.15% by weight or more of salts of Na, Ca, K, Mg, Fe, Cl, $SO_4$, $CO_2$, and combinations thereof. The waste water is separation processes in which the amounts of salts in the effluents does not change, but the monovalent chloride salts are separated from multivalent chloride salts. Preferably subsequent to testing for hazardous materials, the waste water is separated to produces two effluents. Where the initial contaminated water has a relatively low sodium content, it is possible that this water may be used for potable use. Where the contaminated water has exceedingly high sodium or high overall salt content, which is typical of waste waters produced from oil recovery, the first effluent will typically have a salt content, such as 0.15% or much greater, which is not acceptable for use as drinking water. However, it has been discovered that this first effluent in its initial liquid state, or further concentrated to even a substantially solid salt state, can be used for various applications within the oil industry.

Produced water from oil and gas wells are typically high in the chloride salts of sodium, calcium, and magnesium, with lesser amounts of potassium and sulfate. The chloride salts have wide use in drilling oil and gas wells while carbonate and sulfate anions can form troublesome precipitates with calcium and/or magnesium. After testing for and the removal of hazardous or otherwise detrimental materials, one or more separation processes are chosen to preferentially separate the sodium and potassium chlorides as brine or solids from calcium and magnesium chlorides or other multivalent salts. I have discovered that the mixed calcium and magnesium chlorides are suitable as weighting agents in drilling fluids for wells. I have also found that calcium chloride, after removal of magnesium by precipitation using lime, is effective when used to accelerate the setting of cement. I have further discovered that the mixed sodium and potassium chlorides are suitable for use as weighting agents in drilling fluids. In addition, when there is a possibility for drilling through salt formations, the sodium-potassium chlorides may be used to saturate the water in the drilling fluid so as to avoid dissolving salt from the formation and thereby maintain control of the hole diameter.

When a salt saturated cement is required for cementing the casing where it passes through formations containing sodium and potassium salt, the mixed sodium-potassium solutions produced from separation processing can be used in mixing cement. In operation, the sealing is accomplished by preparing a salt saturated cement using sodium-potassium chlorides from separation processing. The volume of salt saturated cement required to completely fill the annulus between the well casing and the walls of the drill hole is calculated, and typically an extra 15-30% volume is mixed and typically without sand or gravel. The entire amount is then pumped into the top of the well casing. Typically, at this point much of the salt saturated cement has passed through the casing and has risen in the annulus from the bottom up. Thereafter, a rubber plug of a diameter larger than the casing inside diameter is inserted into the top of the casing and a valve and fitting is attached to the top of the casing. Water is pumped in above the rubber plug having sufficient pressure to force the rubber plug to near the bottom end of the casing the cement resumes its travel out of the bottom of the casing and up the annulus between the drill hole and casing. Again, the water volume is calculated so that the plug is not forced out of the bottom of the casing which leaves enough cement in the casing to seal from formation pressure when the casing cap is removed and drilling or well completion resumed. As the salt saturated cement moves up the annulus it forces "the drilling mud" ahead of it and out of the top of an annulus at ground level. The volume of cement itself is such that a copious amount follows the drill mud out at the surface as proof that circulation of the cement is complete. The cement is allowed to set, and any excess cement inside the casing is drilled out.

The first product produced from separating the waste water has still additional uses within the oil industry. For example, it has been discovered that the sodium and/or potassium-rich effluent is useful for injection into an oil well formation to maintain fluid pressure. The injection of water into an oil well formation to maintain fluid pressure is also referred to as "water flooding", and is called a secondary recovery process. This long standing practice has commonly used waters produced from oil and gas wells with minimal, if any, changes in composition. It has been discovered that the effectiveness of produced water from oil and gas wells and also other waste waters for "water flooding" can be substantially improved. To this end, the waste waters are collected and tested to determine if it is sufficiently free of hazardous materials. The waste water is then processed by traditional methods to separate the waste water into a first effluent containing the sodium and potassium (if any) salts and being substantially free of calcium and magnesium. The second effluent contains very little sodium salts but contains essentially all of the calcium and magnesium in the original waste water. While produced water from oil wells contains mostly chloride salts, the use of waste waters from other sources, and particularly the membrane concentrate from desalination, most often contains enough sulfate ion to combine with calcium in the original formation water to form a precipitate of gypsum that can plug the formation and reduce oil recovery. After removal of substantially all of the calcium and magnesium, the now "separated water" has an improved wetting power as compared to the to the originally 'hard' waste water. When this first effluent with low sulfate ion is used in 'water flooding" it also effectively and simultaneously removes calcium and magnesium from the formation. This has been discovered to be of great assistance in Tertiary Recovery of Oil, often called Enhanced Oil Recovery. Typically following the end of cost effective water flooding, the amount of oil remaining in place is from 45% to 65% of the original oil in the formation and recovery of additional oil from the formation is to be desired. One type of Tertiary Recovery uses "chemical flooding", where the injection fluid contains one or more surfactants to remove oil from formation pores and surfaces, often by forming an emulsion. The sodium chloride content of the injection fluid is typically maintained above 0.9% for lowest surface tension achievable with sodium chloride alone. Alternately, the salty water rich in sodium chloride functions as the base for the additions of chemicals such as surfactants and/or polymers for Enhanced Oil Recovery.

In still an additional preferred embodiment, about 0.01%-25% of the sodium chloride is processed by electrolysis to convert part of the sodium chloride to sodium hypochlorite (NaOCl) prior to injection into the oil well formation. Sodium hypochlorite has a greater wetting power for introduction into and through porous oil formations. The greater wetting power reduces the energy required for pumping into the formation thereby requiring less energy. In addition, the sodium hypochlorite is of itself a surfactant and reduces the amount of more costly surfactants that are required for economically enhanced oil recovery.

Described above are the various uses within the oil industry for the first effluent produced from water separating of waste water. However, it has also been discovered that waste water, including water produced from oil and gas wells, having a reduced sodium and potassium salts content and increased calcium and magnesium content, can also be used in the oil industry. Typically this second effluent containing predominantly calcium and magnesium chlorides will have a salty content of 1% or greater by weight. In addition, this salty brine can be further concentrated by evaporation. With reference to FIGS. 10-14, the second product can be either can be either a liquid or substantially solid salt product if subjected to sufficient evaporation, and will have an increase in calcium and magnesium content compared to the untreated contaminated water. However, this second product containing calcium and/or magnesium is very useful for addition to drilling muds as a weighting agent. When the magnesium content is higher than desired, the magnesium can be precipitated as Mg(OH)2 and preferably by the addition of lime which forms additional calcium chloride of increased molecular weight as compared with magnesium chloride. The magnesium chloride is collected and used for treating waste waters to clarify them and reduce the heavy metal content, if any.

Presently, the operation of oil fields typically produces substantial unwanted waste water having 0.15% by weight or greater of the salt of Na, Ca, K, Mg, Fe, Cl, $SO^4$, $CO^2$, or combinations thereof. Previously, this waste water would have to be disposed of at high cost. This high cost would be passed on to the consumer by way of increased oil prices. Now, the waste waters can be water separated "on site" for use in the very same drilling fields. Often the oil field waste waters have salt contents far greater than 0.15% which results in a water separated effluent and a regenerative brine which previously could not be used. Indeed, it is anticipated that the water separating of waste waters collected from an oil field site will typically produce a first effluent having greater than 0.15% by weight of salts, and containing a higher sodium and potassium content, and a second regenerative brine typically having greater than 3.0% by weight of salt and having an increased calcium and magnesium content. However, these products as described above, still have usefulness within the oil industry as weighting agents, cement additives and as flooding waters.

The use of waste waters produced from oil and gas wells has been described in generality. However, the waste waters produced from oil and gas wells have a very wide variety of waste products including various salts and metals. One example of variability is produced water from Coal Bed Methane Wells in the Great Plains area of the U.S. As reported by U.S. Geological Survey, the Total Dissolved Solids (TDS) in the alkaline water from Coal Bed Methane Wells varies from 270 to 2400 mg. in the Fort Union Coal Beds alone.

A second example is waters from three natural gas wells each producing from one of three separate production zones in an area of Northern Mexico. The rate of gas production is declining and it is common for produced water from oil or gas wells to be re-injected into a producing formation to maintain or increase the formation pressures that move product to the surface. Quoting from the report on the evaluation of the use of re-injection for these 3 wells; ". . . The primary concern for this study is the potential for solids (scales) to form in the well bore region as well as in the production equipment." The study required chemical analyses and computation of the Scaling Index at the temperatures in the formation to determine feasibility. The temperature of water from one well is reported as 275° F. with salinity and Alkalinity as 30,597 mg/l with 8.9 pH and alkalinity as 1039 mg/l HCO3 and a high scaling factor. Water from the well with highest salinity measures 282° F. and 69,534 mg/l TDS, 7.6 pH, with Alkalinity of 66 mg/l H(CO)3/1 and a lower scaling factor but still positive for scaling. Traditional practice for reducing the scaling potential of waters for re-injection have been to use either or both of lime-soda processing or additions of one of the many proprietary anti-scalant chemicals. Apparently these practices were considered to be infeasible for the location. A computer simulation was run to see if mixing the waste waters would make an injection brine with an acceptable Scaling Index but no mixing ratio that would avoid unacceptable scaling could be found. Consideration of re-injection was dropped and disposal of the produced waters may not yet be economically recycled for re-injection, recovery of valuable water, brines, and salt for use in drilling and operating other wells can be recovered in an area where these products are in short supply.

These variations in waste water constituents require the use of various methods of water purification and use which may be selected and practiced according to flow sheets illustrated in FIGS. 10-14 that is specific to the local conditions. Testing by chemical and/or mechanical separation for oil, suspended solids, and metals as well as the more common salts of Na, K, Ca, Mg, Fe, Cl, SO4, CO2, and HCO2 salts is preferred for the selection of water purification processes, and their sequence of use, so as to ascertain the optimum point in the flow sheet for the removal of contaminants to levels safe for the intended use.

Figure 10:
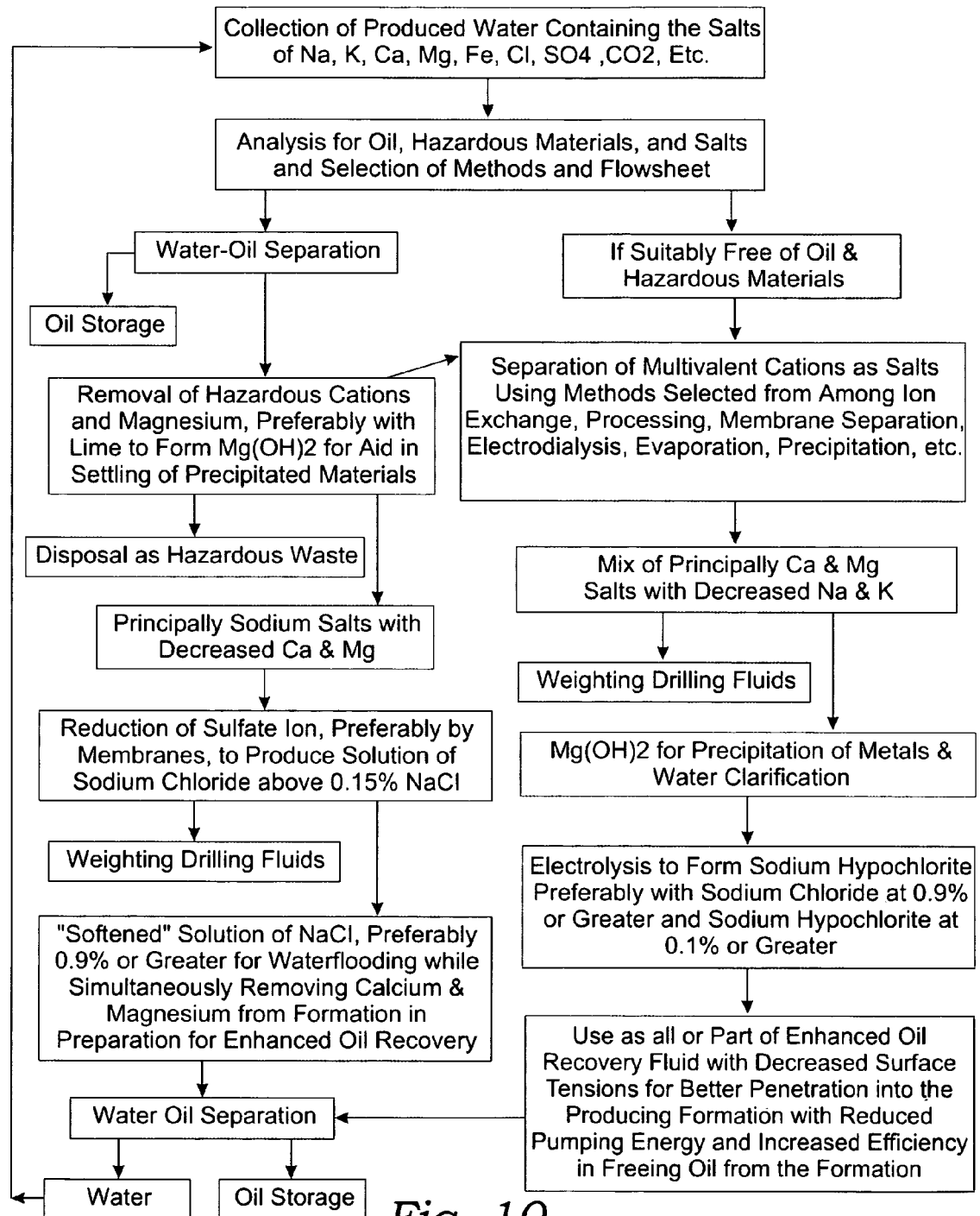
FIG. 10 is a flow chart of still another preferred method of the invention directed to the use of the products from water purification processes for the oil industry including for use as an Enhanced Oil Recovery Fluid.

Now described in more specificity, an example of one of the preferred methods of processing and using waste waters produced from oil fields is illustrated in FIG. 10. FIG. 10 illustrates a general example of the process of the present invention for analyzing local conditions of waste waters for selecting the best practice of the present invention. A first step in the process may include testing of the waste waters for oil, hazardous materials and salt content. Depending upon the results of such analysis, contaminants may be removed as shown in one of the paths shown in FIG. 10. However, in the first stage separation of where salts of monovalent cations, predominantly sodium and potassium, are separated from salts of multivalent cations, predominantly calcium and magnesium, metals will report with the calcium and magnesium chlorides which are concentrated in a reduced volume of solution. This allows the removal of metals by precipitation along with magnesium by the addition of high pH hydroxides preferably lime, as either calcium oxide (CaO) or hydroxide Ca(OH)2, and/or sodium hydroxide Na(OH) of potassium hydroxide K(OH). It is well known that the flocs of precipitated magnesium hydroxide aid in the settling of co-precipitated metal hydroxides and other particulates. The use of lime is preferable because the cost is lower than for sodium or potassium hydroxide and the use of lime produces a weight of calcium chloride greater than the reduction in weight of magnesium chloride according to the following reaction.

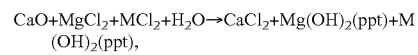

$$CaO+MgCl_2+MCl_2+H_2O \rightarrow CaCl_2+Mg(OH)_2(ppt)+M(OH)_2(ppt),$$

wherein M represents a divalent metal cation. Having noted that a wide range of analyses and a wide range of recycled products can be produced, FIG. 10 is presented as a generalized flow sheet. Typically these processes are cost competitive with evaporation up to about 15,000 mg/l TDS but again, local conditions are the determining factor.

Figure 11:
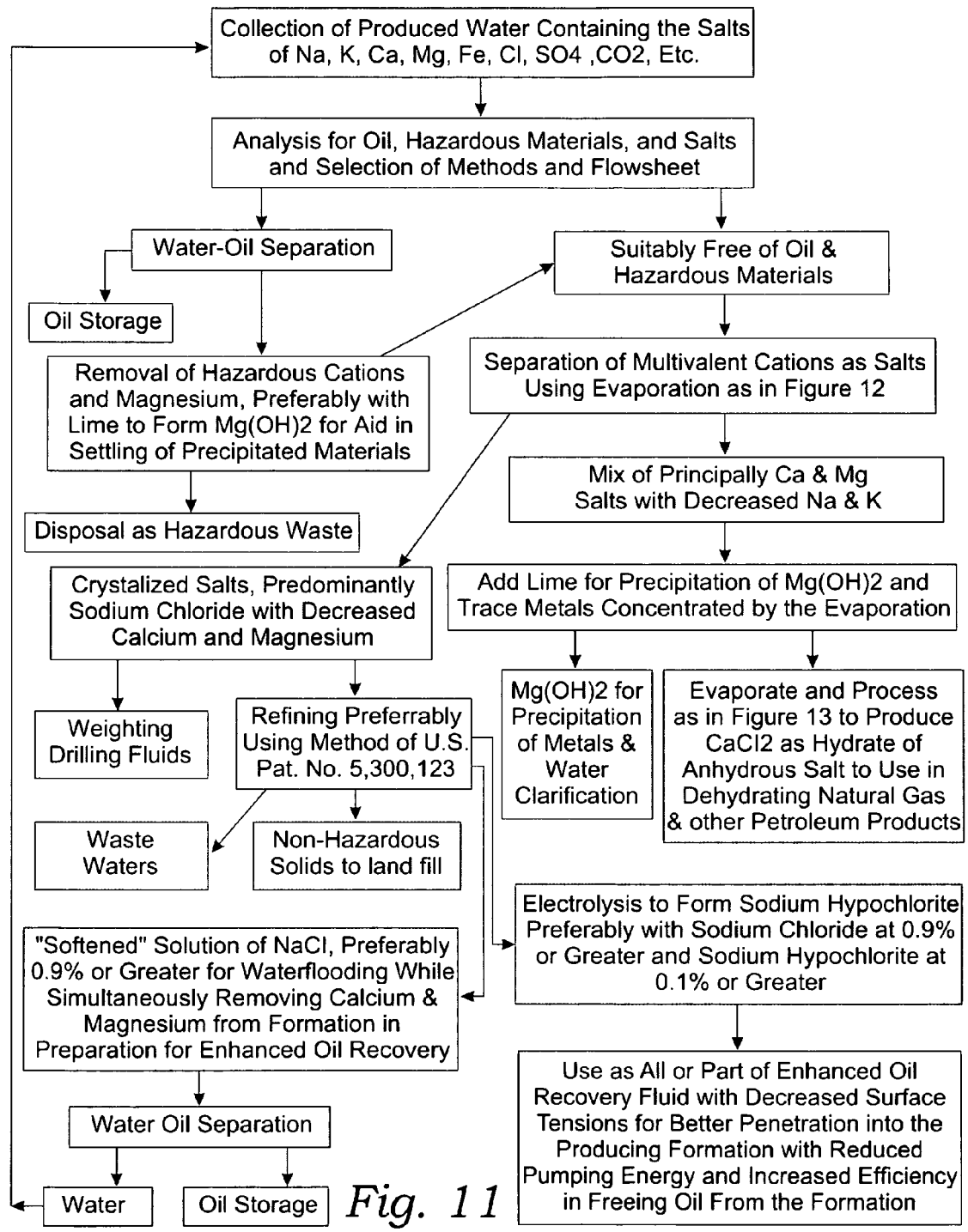
FIG. 11 is a flow chart of still another preferred method of the invention directed to the use of the products from water purification processes for the oil industry including for use as an Enhanced Oil Recovery Fluid.

FIG. 11 illustrates an additional embodiment of the invention which is preferably practiced where the waste waters possess constituents different than those processed in FIG. 10. With reference to FIG. 11, the brine from Permian Basin is used in this example. After evaporation in solar ponds to crystallize the monovalent sodium and potassium chlorides and reduce their content preferably to about 1% or less, the recovered sodium chloride here described as the first effluent, will total about 62,500 tons/year. The remaining brine, here described as the second effluent, will contain 5,160 of calcium-magnesium chlorides at a concentration of 37-39% plus about 500 tons of sodium chloride. This concentration is near the highest practical working concentration because of the influence of temperature on the solubility of calcium and magnesium chloride where even slight drops in temperature below 60° F. cause hydrates to form and settle in pumps, piping, valves and containers. Where transportation requires reduced weights, additional evaporation can be carried out to remove essentially all of the sodium chloride and to produce hydrates of calcium chloride containing up to 80% calcium chloride.

The crystalized sodium chloride is suitable for all of the uses of common solar salt, including weighting of drilling fluids, making salt saturated brine for drilling through salt formations and making salt saturated cement for securely sealing casing penetrating salt formations. When this salt is purified, preferably according to my U.S. Pat. No. 5,300,123, the purified salt low in calcium and magnesium is particularly well suited for conversion to concentrations of sodium hypochlorite preferably of more than 0.1% and up to 12-15% sodium hypochlorite which reduces the surface tension of injected fluids to permit the fluid to enter passages in the formation too small for penetration by liquids of higher surface tension, and to free additional oil from surfaces of the formation, and to reduce the power required for pumping. This salt low in calcium and magnesium has particular use in sodium separating water of up to 10,000 ppm to below 10 ppm hardness and suited for use in preflushing calcium and magnesium from a formation prior to the use of surfactants and/or polymers in Enhanced Oil recovery that require sodium chloride.

Based on experience in solar evaporation in the Hot and Arid areas of the USA at least 80% of the evaporation and process energy can be solar evaporation and, compared with the cost of pumping energy, the energy savings alone will return the entire investment in two years or less.

As compared with expansions in the production of calcium chloride from natural brines in Arkansas and Michigan which use fuel fired evaporation, or electrically powered evaporation by vapor recompression, this is a most competitive use of renewable solar energy. For recovery of products by evaporation at many drilling sites, where the electricity is generated at or near the site, and also at sites along pipelines where diesel or gas turbine engines are used to power pumps and/or compressors for maintaining pipeline pressures for transporting oil and gas, the evaporation is readily accomplished using waste heat from these engines.

Figure 12:
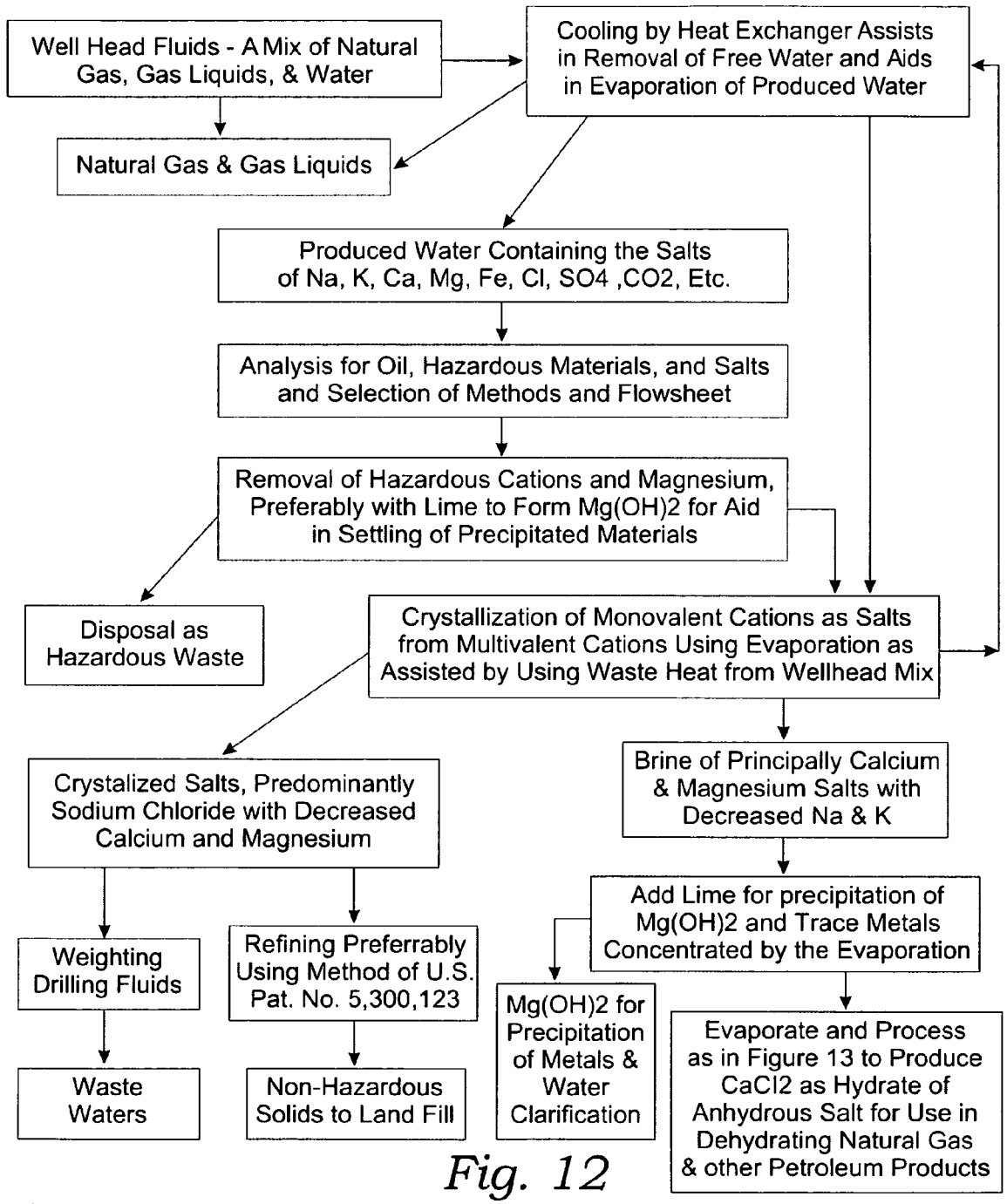
FIG. 12 is a flow chart of still another preferred method of the invention directed to the use of the products from water purification processes including within a heat exchanger for a wide variety of applications for the oil industry.

In still an additional embodiment of the present invention, FIG. 12 is a flow-sheet illustrating disposal and use of the produced water from natural gas wells such as those found in Northern Mexico. Gas production is reported as 1.66 MM cubic feet/day and water produced is 2646 bbl/day (111,000 gallons/day). The temperature of the gas and produced water as it exits the wellhead, recorded from the 3 wells as 275° F., 282° F. and 282° F., makes it beneficial to reduce the temperature of the gas before entering the pipelines and condense the water. The latent heat in the natural gas and produced water at the well head, and to be reduced before pipelining, is sufficient that, when the produced water has been collected to maintain a working reserve, from that point on the evaporation of produced water by the latent heat in the produced gas and water is sufficient to evaporate substantial amounts of purified water for collection as condensate suitable for potable uses, irrigation, etc. in an area where water is scarce. This evaporation using waste heat simultaneously increases the concentration of the salts in the brine preparatory to solar evaporation. Brine cooled in the evaporation ponds can also be used to cool the gas-water mix. The sodium chloride and calcium chloride brine recovered will replace products imported from great distance at a large expenditure of fuels. The volume of waste for disposal is greatly reduced.

Notably, FIG. 12 illustrates a process substantially similar to that shown in FIG. 11. However, the process shown in FIG. 12 provides greater specificity as to the use of evaporation for the separation of the salts of multivalent cations from the salts of the monovalent cations. This process adds the simultaneous and beneficial use of the waste brine in cooling the well head fluids while simultaneously using the heat from the well head fluids for the evaporation whether in ponds or other evaporators.

Figure 13:
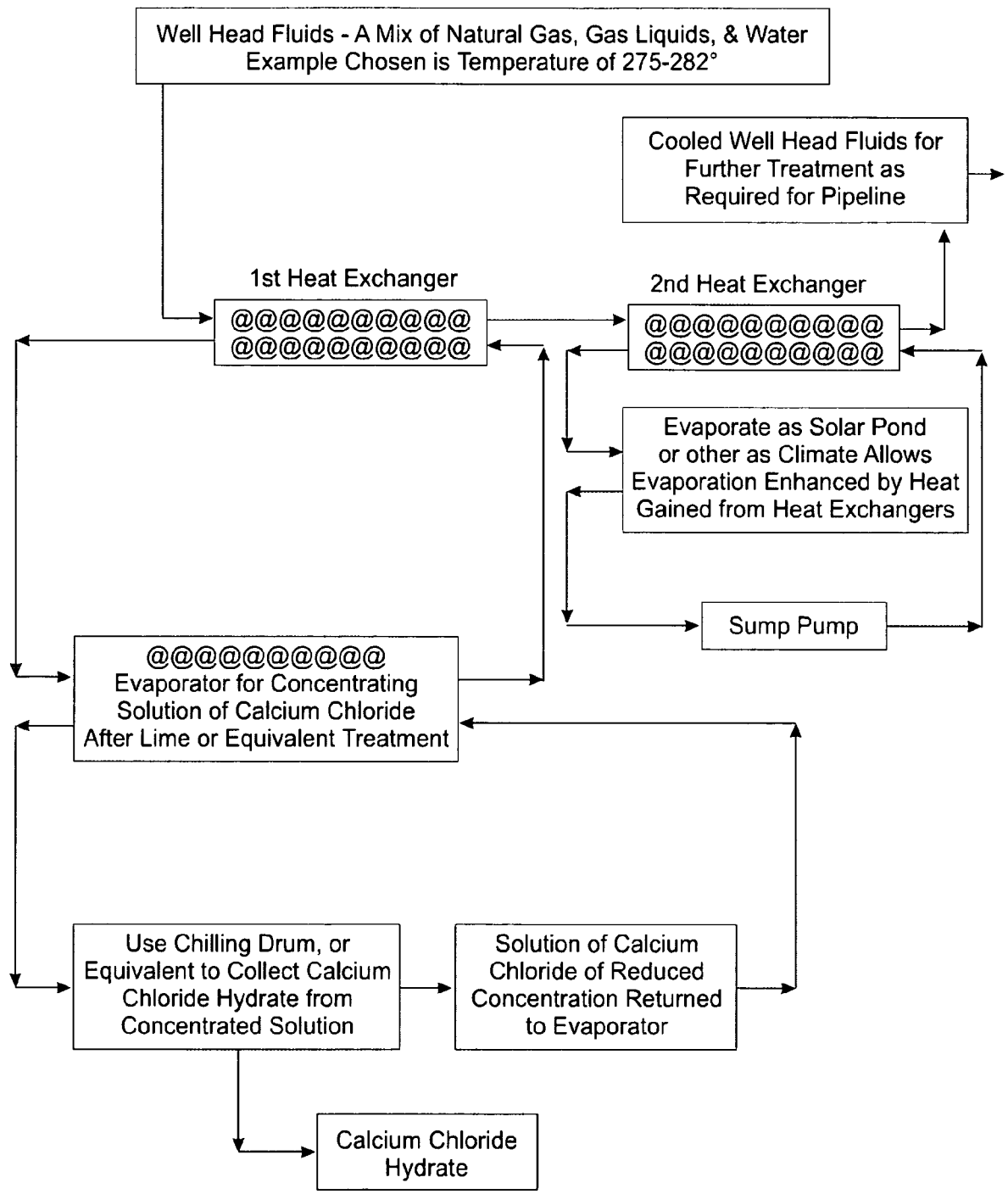
FIG. 13 is a flow chart of still another preferred method of the invention directed to the use of the products from water purification processes including within multiple heat exchangers used within the oil industry.

FIG. 13 illustrates an additional example of use of a heat exchanger into the water processes of the present invention for using waste heat in well head fluids. Simultaneously, cooling well head fluids are dewatered (the removal of liquid water) using sequential heat exchanger for regenerating absorbent materials. Preferably, calcium chloride is used for the sequestration of water. For temperatures between 275° F. and 282° F., ethylene glycol may be sued as a absorbent.

Continued with reference to FIG. 13, the heat exchanger is particularly useful where the oil or gas well has a warmer well head, such as above 220° F. which can be used to evaporate waste waters to concentrate calcium chloride. The partially cooled well head fluids are then passed through the second heat exchanger (evaporator) shown in FIG. 12 for a second stage cooling with a corresponding increase in evaporation. FIG. 13 also illustrates the production of $CaCl_2$ Hydrate or anhydrous salt for use in dehydrating natural gas or other petroleum products. Not shown in FIG. 13, the water vapor from the first evaporator can be condensed for further use.

Figure 14:
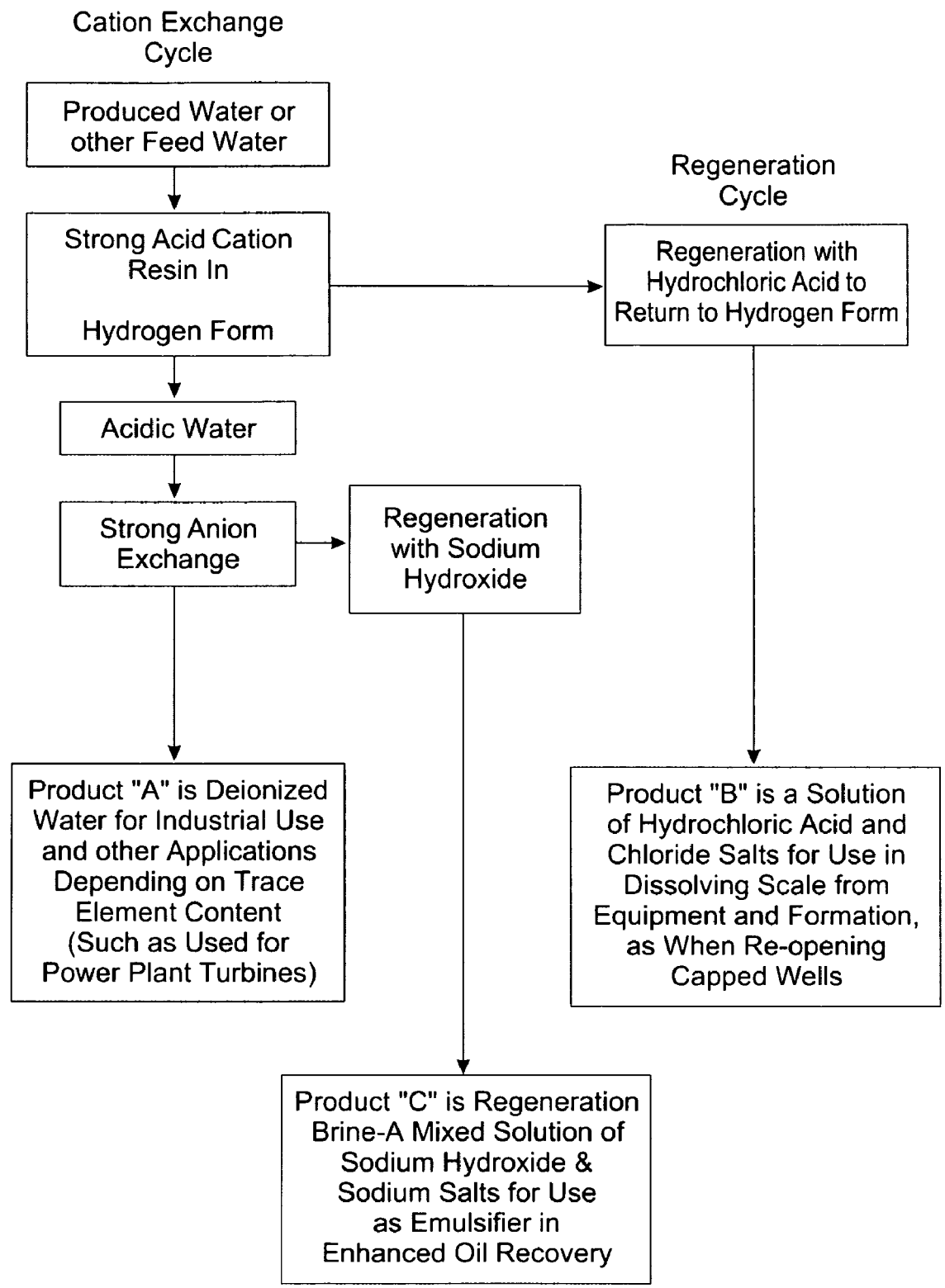
FIG. 14 is a flow chart of still another preferred method of the invention directed to the use of the products from water purification processes including within power plant turbines, as an emulsifier and when reopening capped wells within the oil industry.

FIG. 14 illustrates the processing and uses of the effluents from deionization by ion exchange. The use of deionization by manufacturers of electronics, medicines. etc is already well known and growing fast. Typically, regeneration is done with expensive hydrochloric acid and sodium hydroxide. Only a part of these materials is consumed and the remainder creates a problem in disposal as individual items. So common practice is for these two materials to be mixed for mutual neutralization in accordance with the reaction:

$HCl+Na(OH) \rightarrow NaCl+H_2O$. Additional acid or sodium hydroxide is added as required to make a solution of waste salts with a pH acceptable for discharge to a sewer or brine line. This results in a waste of materials typically containing as much as half of the original hydrochloric acid and sodium hydroxide.

At the same time, large volumes of hydrochloric acid are used in removing scale from oil well equipment and producing formations, and particularly so when the oil or gas well has been capped for an extended period of time. Many oil and gas wells have increased volumes of produced water in the form of a high water/oil or water/gas ratio in the later stages of production. Often the cost of disposal of produced water makes production unprofitable and periods of low energy prices cause many wells to be capped.

With reference to Product B in FIG. 14, most often the analysis of the water in the formation is favorable for the precipitation of calcium and/or magnesium compounds that are deposited as "scale". This continues and over time the formation, the piping, and pumping equipment lose capacity to carry the oil and water. Reopening of capped wells often requires removal of the scale and the most used material is a solution of hydrochloric acid which dissolves scale. But many formations contain clays which will swell and plug the formation unless the acid is mixed with a material that keeps the clays from swelling, such as phosphoric acid or an excess of sodium salts. The regeneration brine from the Strong Acid Cation resins used in removing cations by deionization is such a solution and typically requires only dilution with water before use.

With reference to Product C in FIG. 14, the regeneration brine for Strong Base Resins used in removing anions during deionization is most often sodium hydroxide, though it may be potassium hydroxide or even ammonium hydroxide as described in my pending U.S. patent application Ser. No. 11/495,979 filed Jul. 28, 2006 which is incorporated in its entirety by reference herein. The residual hydroxide in the spent regeneration brine is highly effective when used as an addition to water flooding as a wetting agent that allows better penetration of formations and/or when used at strengths that strip crude oil from formation surfaces by emulsification.

In addition to the uses for waste waters described above, I have discovered many additional uses for waste waters and the products produced from purifying waste waters.

Salty Irrigation Drainage

Irrigation water contains salts and some inorganic fertilizer materials that are used by plants in varying degrees but rarely, if ever, in their entirety. Plants separate water and nutrients selectively for growth and for temperature regulation by evapo-transpiration. Some water is evaporated at the soil surface leaving the salts behind. The remaining water becomes salty, and, if not flushed out of the root zone, reduces the crop yield. The continued pumping of ground water can continue to deposit the salts until their concentration makes agriculture uneconomical.

Where the irrigation water is from a source other than local groundwater, the downward percolating irrigation water causes the local water table to rise. When the water table nears the surface, say to about 6 feet or less, the salty water can migrate upwards reducing crop yield and eventually covering the surface with salts. These once productive lands become barren.

This has been occurring since the first recorded irrigation along the Tigris and Euphrates Rivers of about 3000 years ago. Today, tens of millions of hectares of once fertile land are no longer productive because of salty irrigation drainage.

We presently mine something more than 250,000,000 tons of salts each year and this includes great amounts of the salts found in salty irrigation drainage. Ironically, large amounts of some of the salts being mined are used in agriculture.

The recovery of some or all of these salts, with or without some of the waters, becomes increasingly necessary and desirable.

Waste-waters high in sulfate are also produced in geothermal operation and from other natural sources. While this discussion is stated mostly in terms of irrigation drainage, persons skilled in the art will recognize that the work herein described is applicable to these other sulfate waste or by-product waters.

Irrigation drainage is different from salty wastewaters, which result from industrial use of sodium chloride and other chloride salts. (Reference patent and patent pending. The ocean and the salt deposits from the drying of ocean waters and most inland lakes collecting surface waters from rainfall are high in the negatively charged anion, chlorine (Cl) as compared with the sulfate anion ($SO_4$). Ratios of Cl ion/$SO_4$ ion are;

8.45Cl/1$SO_4$—Great Salt Lake of Utah 7.1/1—Seawater 1.3/1—Salton Sea; This irrigation drainage includes the leaching of chloride salts from irrigated land which was once the floor of an ocean bay.

The heavy agricultural use of sulfate soil amendments like gypsum and of fertilizers like ammonium and potassium sulfates reverses the ratio for irrigation drainage and some ground water. The only chloride fertilizer used in significant tonnage is potassium chloride, commonly called potash.

Agricultural Drainage in the San Joaquin Valley of California exhibits this reversal with $SO_4$/Cl ratios varying from 2.2/1 up to as high as 27/1.

Different technology is required and different salt products may be recovered so as to add to the uses for salts recovered from wastes.

The alkaline nature of these waters also allows higher carbonate content.

The different products to be recovered form these different waters allow a wide expansion of the beneficial uses for salts recovered from wastes.

Thus, some of the methods for recovering products from irrigation drainage differ from those used for recovering salts from chloride-type wastes. Additionally, the products themselves vary according to the amounts of each salt in the wastes, and of course the carbonate and sulfate products increases the number of uses of salts recovered from wastes. Each new use of a salt product cuts the waste volume. The uses can be expanded until the waste volume becomes almost negligible. One factor contributing to the expansion of uses is the high volume of irrigation drainage waters, their widespread occurrence, and their rapid growth in their volume that endangers sustainable agriculture.

Local Recycling of much of the recovered salts back to the soil reduces the need for mining and also reduces the energy use in the mine-to-market haul.

Recovery of salts near to markets so lowers their distribution cost as to make new uses economical and old uses less costly. The reduction in the cost of disposal of a waste plus the reduced energy use in transportation of the salts are added benefits.

Dramatically lower costs expand the economical uses and contribute to the overall benefits of the economy. There are many uses for salts that do not require the purity of the grades of commerce now in general use. This allows the preparation of usable grades at minimum cost and the even lower costs again serve to broaden the fields of economic use.

How Salts Work With Soils. Clays are the original ion-exchange media and it was a study of soils that started the present day art and science of ion exchange. All soils have a clay component and the physical characteristics of clay changes very much as the type and amount of the cations Ca, Mg, and Na, vary. Further, the properties also vary according to the ratio of the dominant anions, chlorine and sulfate. It takes a lot of salt to satisfy the ion exchange requirements of soils. The top one foot of naturally packed soil weighs about 100 pounds per cubic foot, 4,328,000 lbs., or 2164 tons/acre. Though the weight percentage of these salts is small in relation to the weight of the soil, the amount of the salts is large because the weight of the soil is so very large. Therefore any attempt to alter the balance of the ions that control the clays requires large amounts of salt.

EXAMPLE

This is demonstrated by California's use of something over 300,000 tons of calcium sulfate from mines as a soil amendment each year for mitigating the effects on soils caused by sodium brought to the fields by irrigation water. The irrigation waters brought into the San Joaquin Valley contain approximately 1.6 million tons of chloride salts per year. The Salton Sea receives about 4 million tons of salts per year from all forms of runoff, of which 60% or more is brought in with the approximately 3 million acre feet of Colorado River Water used yearly for irrigation.

Sustainable agriculture in California requires the removal of a minimum of about 5-6 million tons of salts each year from salty irrigation drainage whether from runoff or from a rising salty water table. Though some salts may be exported, to avoid the dollar and environmental costs of stockpiling waste, most salts find domestic uses. I have found that large tonnages of sulfate salts can be recovered for use locally for return to the cultivated fields and for related agricultural uses such as stabilization of farm roads, reduced dusting, and use for storage of ambient energy, solar energy, and waste heat from fossil fuel burning and the use of electricity.

Direct Use of Irrigation Drainage

Irrigation drainage most often carries an appreciable amount of calcium as the carbonate. When a sulfur dioxide containing gas is brought in direct contact with such irrigation drainage the sulfur dioxide is reduced by reaction with the calcium carbonate to form gypsum. The gypsum, after washing, is used to replace some of the gypsum now mined for use, for example, as a soil amendment in agriculture and for producing wallboard.

When irrigation drainage is mixed with salty water produced from oil or gas wells where the formation has an oceanic origin, the calcium chloride in the produced waters reacts with the sulfate in the irrigation waters to produce gypsum. There is a corresponding decrease in salts content of the blended waters and the gypsum can be used as noted above.

Products from Irrigation Drainage and Other Sulfate Type Waste Waters

Calcium Carbonate—As evaporation progresses, the first salt product to separate is calcium carbonate, a mineral that is mined by the tens of millions of tons/year.

The calcium carbonate recovered from irrigation drainage has properties that, for many uses, render it much superior to material mined from the typically very large and hard deposits. For limestone, most uses involving chemical reactions work best and faster as the surface area is increased and fresh surfaces are produced by size reduction.

Production of chemically active limestone, as differentiated from construction uses for aggregate or blocks where the desired property is mostly mechanical, takes much energy in the form of stripping of overburden, drilling, blasting, grinding, and restoration of the surfaces as required for mine reclamation. Thus it is desirable to reduce the great expenditures of money and energy for mining while reducing the problem of what to do with salty irrigation drainage.

By contrast, during solar evaporation the calcium carbonate crystals are formed so small that, in still waters, they actually float. After sinking due to continued growth and/or water turbulence, the apparent growth is more by agglomeration of small crystals than by continued growth of individual crystals. Further, both the small crystals and the agglomerations are weak as compared with natural deposits and may be easily ground to give the large amounts of freshly fractured surfaces most desirable for chemical reactions.

Experimental—Irrigation Drainage from the Salton Sea

The Salton Sea in Southeast California receives irrigation and domestic drainage containing large amounts of mixed salts including nitrates. Evaporation has concentrated the salts to 25% higher than seawater. Much of the Sea is shallow and warm weather fosters algae blooms that result in large kills of fish and wildfowl. Reversal of these conditions requires the removal of salts at some rate greater than the inflow. Much of the salt content is beneficial to agriculture and should be returned to the areas of farmland that need them. Huge needs for common salts are accumulating because the present prices for the salts are too high.

The Imperial Valley area in which the Salton Sea lies was once part of the Sea of Cortez. It was cut off by the spreading delta of the Colorado River and dried up to become a large depression. Flooding of the lowest part started with a canal breaking in 1908. Irrigation drainage and other inflow has increased the surface area of the Salton Sea (SS) to 381 square miles (98,700 hectares) at an elevation of 227 feet (69 meters) below sea level (1). Irrigated land on the periphery of the depression receives 3 million acre feet ($3.7 \times 10^9$ cubic meters)/year of Colorado River Water with a salinity varying around 700 PPM TDS. The SS itself receives 1.3 million acre feet ($1.6 \times 10^9$ cubic meters) of irrigation drainage and other runoff. The incoming salts concentration is about 4400 PPM TDS for an inflow of over 3.6 million metric tons of mixed salts per year. Evaporation has raised the levels of salts to 44,000 PPM TDS of which about 900 PPM is $NO_3$. The nutrient content of the water is so high that warm weather triggers algae blooms, usually in shallow areas, that deplete the oxygen causing massive fish kills. Large numbers of wildfowl also perish, possibly because they eat the decomposing fish. No evidence of excessive levels of pesticides or of selenium above 1 PPB has yet been recorded. Work is underway to save the wildfowl and fish habitat and to return the Salton Sea to its former status as a prime recreational area. Government funding probably will include only provisions for "landfilling" the recovered mixed salts.

Tests were run so as to duplicate, on a reduced scale, the typical solar practice of two or more evaporation stages, in series, to get best evaporation efficiency. Evaporation was carried out in duplicate pans 33 cm×63 cm×10 cm deep, lined with polyethylene film. Daily ambient highs were 38-42° C. and night lows were 15-17° C. less. Daytime relative humidity was 15 to 25%. The specific gravity (sg) of the Salton Sea water was 1.03 as measured by hydrometer.

On the second day of evaporation (sg 1.047) white flakes were forming with many floating on the brine surface. By morning of the third day, at (sg 1.057), the flakes formed an almost continuous covering. The evaporation rate varied between 0.9 and 1.2 centimeters per day until the specific gravity was at 1.145 and the floating crystals, now including other salts, formed a thick continuous (surface) skin that hindered evaporation.

Before the skin formation the brine temperature daily highs were in the range of 22-30° C. After a continuous skin formed on the surface the brine temperatures were as high as 48° C. At this point, sg 1.145, about 75% of the precipitate in pan 'B' was taken for analysis and allowed to drain but was not washed. It analyzed 17.8% Ca, 0.8% Mg, 0.51% sulfate, and 0.18% potassium.

Evaporation was continued to sg 1.22 and sodium chloride was observed. A sample of the crystallized salt was taken from the pan from which much of the calcium solids had been removed for the first analysis. The crystals were generally small with none larger than 3 mm.

This sample was rinsed for 10 seconds with an equal weight of the starting brine and then allowed to drain outdoors for 3 days. This was the only 'washed' sample in either run. The analysis, dry basis, was; Ca, 0.058%, Mg, 0.357%, SO4, 0.021%, and K, 0.137%. With even this minimum of preparation, this salt met the specifications of most states for deicing salts, and is suitable for soil stabilization, pond sealing, and all such uses of common salt.

For those skilled in the art of salt production, it is apparent that, with simple washing to lower the magnesium content, this salt will meet the American Water Works Association specifications for water softening. It can also be treated in a conventional manner for reducing the calcium and magnesium to levels suitable for electrolysis to caustic and chlorine.

The suitability for water softening is particularly important as the greatest single salt use in California is for softening water for steam assisted production of Heavy Oil. Such steam assist is used in production of more than 145,000,000 barrels/year, nearly half of California on-shore oil production. The use of surfactants and emulsions for Enhanced Oil Recovery uses softened water to minimize surfactant use. Increasing oil prices makes these practices more economical and the recovery of waste salts reduces costs for increased recovery.

Some of the bitterns did not evaporate to dryness even under these hot dry conditions. This proves their value for dust control on the dirt roads common in Southern California.

A second run using the same evaporation pans and a similar procedure was made in late September as the nights started to cool. Analysis of the recovered salts followed the pattern of the first tests. All salt samples contained more than 90% sodium chloride without washing or separation of windblown dirt and dust. These samples are suitable for soil stabilization and pond sealing 'as is' and as crude salt suitable for refining by my U.S. Pat. No. 5,300,123 to a purity up to and including chemical grade sodium chloride.

One liter of the remaining brine (sg 1.342) was further evaporated outdoors until a level slightly above 520 ml. total of brine and settled salts was reached. Some of the precipitated salts had adhered to the glass above the brine level and are not included in this volume. The brine was drained and 480 ml. was recovered at sg 1.293., Despite the evaporation of over half of the water, the precipitation of the salts due to temperature changes had lowered the specific gravity of the brine.

This 480 ml was divided into 100 ml. and 380 ml. splits. The 100 ml was transferred to a 200 ml beaker, which was then sealed with plastic wrap to avoid evaporation. It was then cooled by refrigeration in a compartment at 4.4° C. The wrap was removed only for as long as it took to measure temperature with a thermometer that was also kept in the refrigerator. The first precipitation of fine crystals was noted at 14° C. Cooling was continued overnight in an iced compartment. The morning temperature was 2.2° C. The fine precipitate had caked at about 45% of the total volume. A stir spatula was used to break the cake into fine particles, which were allowed to settle. The settled level was about 40% of the total volume. The liquid was drained and the wet solids were heated in a microwave oven for 3 to 5 second intervals to avoid overheating and evaporation. At 20 seconds total heating time the crystals had melted enough to allow temperature measurement (30.5° C.). In 7 minutes it dropped to 27.7° C. and held. This was the apparent melting point of the crystals in contact with that brine.

Brine hardness was measured using a Hack Kit 5B and the procedure used for checking brines used in water softening [9]. It was 1020 grains calculated as calcium carbonate.

The 380 ml split was placed into a ceramic bowl, sealed with a thin clinging plastic wrap, and put out to chill overnight. The air temperature was 14° C. at midnight and 10° C. at 6:10 AM. The sample temperature was 9.5° C. The volume had not measurably decreased so the indication is that the night low was cooler than the 6:10 AM temperature.

The brine in the bowl remained very clear and appeared to be unchanged but, on examination, it was found to contain many crystal clear acicular crystals 4 to 6 cm. long. These were removed with a stainless steel table fork, drained, weighed, and then placed on filter paper for blotting some of the adhering brine. The blotting removed an additional 3.5 grams of brine. The drained and blotted weight was 58.1 grams and the sg of the remaining brine was 1.254 (60° F.).

40 grams of these crystals were placed in a 125 ml sample bottle and heated in the microwave for short increments to initiate melting. The 'hold temperature' was measured, the liquid was then drained from the bottle, and a hardness measurement made on the drained liquid. Four cycles were completed. Each time the hold temperature was 27.7° C. (81.9° F.). The hardness equivalents of the melts were 1320, 2100, 1500, and 1500 respectively. This sodium sulfate containing about 2-3% of magnesium and minor amounts of other salts fuinctions well for heat storage and the phase change point lies within the optimum range for raising chickens, for example, and also for aquaculture as in raising tilapia, for example.

It is common knowledge that one may change the amounts of salts in a mix with sodium sulfate in order to control the temperature at which the phase change occurs. For example, it is possible to lower the temperature at which the phase change occurs down to about 65° F. using sodium chloride alone. This ability to make these mixtures is well known to those skilled in this art. In this case the complete mix is made from salts recovered from wastes.

Also well known are the methods for separation of the magnesium, and other salts, from the sodium sulfate. The magnesium may be separated by adding lime or hydrated lime. The precipitated magnesium oxide, or hydroxide, is particularly suitable for use in neutralizing minerals in acidic solutions because the precipitate settles well.

For example, (Reference—Bureau of Mines Report of Investigations No. 9023; "Reclaiming Heavy Metals From Waste water Using Magnesium Oxide".) when minerals were precipitated with magnesium oxide prepared by calcining magnesium hydroxide, the settled volume of the precipitate was only ¼ of the volume of precipitates from using calcium oxide or calcium hydroxide.

Sodium Sulfate for Heat Storage

Sodium sulfate deca-hydrate is the most widely studied material for storing phase change energy because it is effective at temperatures within our daily experience, say from refrigeration at 4° C. to warm water at 31° C.

Uses extend from filling water bottles to keep one's feet warm to heating entire living and working spaces.

It is possible to produce sodium sulfate recovered from irrigation drainage and similar salty wastewaters, to the purity commonly used for heat storage and energy conservation. Additionally, I have found that it is not necessary to have the high purity sodium sulfate used by others for energy storage.

I have found usable heat storage properties in mixed salts as recovered from irrigation drainage by evaporation. I have found other usable mixes where these salts are only partially separated by the use of ambient cooling and/or heating, and no fossil energy is required other than that used for materials size control, handling and transport.

Uses extend from filling water bottles to keep one's feet warm, to heating entire living and working spaces, and, using the phase change at 241° C., even for refrigeration according to the cycle used for refrigeration by burning propane.

These low cost salts are ideally suited for massive energy storage for agricultural uses. It is well known that different plants and animals grow best at some discrete range of temperature suited to their species.

An abundance of low cost sodium sulfate allows the use of stored solar heat to heat living space of plants and animals at night. It also allows the use of nighttime coolness to be stored for use in cooling living space in the daytime for plants, animals, and for humans.

Pure anhydrous sodium sulfate also undergoes a phase change at 241° C. (465° F.) with the absorption of 27 BTU/lb (15 cal./gm.) of material. I have found that considerable amounts of other salts may be tolerated while retaining much of the value for heat storage.

Using pellets of the anhydrous material recovered from wastes makes it more economical to store solar energy or to transfer waste heat, from flue gases for example, at that very usable 241° C. Storage of heat at this temperature is suitable for refrigeration.

Thus it is demonstrated that heat storage products of great utility can be prepared using materials recovered from common wastes, and with a minimum expenditure of energy for processing.

More Experimentation—Irrigation Drainage from Central San Joaquin Valley

Irrigation drainage from the San Joaquin Valley of California containing about 0.8% Total Dissolved Solids (TDS) was evaporated in a test pan. The first separations observed were limestone precipitates floating on the surface. Evaporation was continued from the starting depth of 3.25 Inches to 0.5 inches. The solids were separated by gravity, placed in a closed container along with enough of the remaining brine to keep them well submerged, and stored outdoors from Jul. 2, 2000 until Apr. 3, 2001., This would correspond with pond storage from early in an evaporation season until the end of a winter's harvest period.

After separation and washing in water (20 ppm max. TDS), the agglomerations were broken by rubbing between the fingers. Drying produces more agglomerates and these were again broken by rubbing between the fingers and then screened.

The size was 97% through a 20-mesh screen, 84.8% through a 60-mesh screen, and 60.5% through a 100-mesh screen. This meets the typical specifications for agricultural limestone (State of Pennsylvania) for agricultural limestone of 95% through a 20 mesh screen, 60% through a 60 mesh screen, 50% through a 100 mesh screen without the expensive and energy intensive mining and grinding of common practice.

The sample was then titrated with normal hydrochloric acid and the alkalinity was determined to be the equivalent of theoretically obtainable calcium carbonate.

This calcium carbonate recovered from irrigation drainage and similar waste waters can be used for all the usual types of acid neutralization including mine drainage, streams with low pH water due to acid rain, and for desulphurization of the flue gases from sulfur containing fuels.

Still More Experimentation—Drainage from Southern San Joaquin Valley

Salt samples and a residual brine sample were taken directly from one of several solar evaporation ponds totaling about 80 acres. Before being shut down, the ponds had been used for about 15 years to evaporate irrigation drainage. Mitigation requires salts removal and land reclamation.

Analysis of five (5) previous samples of salts from these ponds, as provided by California Dept. Of Water Resources (DWR), show sulfate ion contents of about ⅔ of all ions in the analysis, other than water. Analysis of one sample was approximately 85% sodium sulfate, 11% calcium sulfate, 2% magnesium sulfate, 1.6% sodium chloride with 0.6% as potassium and boron compounds (dry basis).

It is presumed that rainfall leached much of the sodium chloride from the salts after the ponds were drained.

A sample was dissolved to make a saturated brine. The brine was chilled to 38*F, well within the range reached by outdoor spray chilling in winter.

The crystallized hydrates were found to have a phase change from hydrate to melt at 82° F., just as did the hydrates recovered from the Salton Sea by solar evaporation and chilling outdoors.

A sample of the residual brine from that pond was chilled to below 32° F. without crystallizing any hydrates. On chilling to below 22° F., there was some precipitation of what is believed to be sodium di-hydrite, a compound known to form from sodium chloride brine at 22° F.

This remnant brine is very suitable for dust control and even for use as a liquid for heat transfer in refrigeration, and, after lowering of the sodium by evaporative crystallization, or chilling, is valuable for return to the soil to provide the calcium and magnesium needed as plant nutrients and for soil modification.

Sodium Sulfate for Modification of Properties of Soils

The crude sodium sulfate type salts perform well for pond sealing and for soil solidification, and for resistance to erosion by wind and water.

Lime stabilization of soils is a common practice: lime takes up water forming calcium hydroxide which reacts by dissolving silica from the soil and forming bonds of calcium silicates. It has been shown that the rate of the formation of silicate bonds is greatly accelerated by the inclusion of sodium chloride with the lime and the use of waste sodium chloride was suggested for this purpose.

I have found that the inclusion of sodium sulfate, along with or in place of, the sodium chloride added in that practice, immediately starts to produce sodium hydroxide and gives a much faster increase the rate of formation of the binding silicates. Further, the lime-sodium sulfate reaction produces gypsum that sets quickly. This early strength assists in reducing the breaking of the silicate bonds during the "cure time" before the silicate bonds are developed enough to resist such breakage. The gypsum sands of Daytona Beach are a well-known example of gypsum in a driving surface.

In soil solidification, the entire spectrum of needs can be supplied from products derived from waste irrigation drainage.

A—the calcium carbonate is separated during evaporation and calcined to form the required lime.

B—the irrigation drainage can be used as compaction water along with the lime and salts, C—the irrigation water can be partially evaporated to increase the amount of salts in the compaction water, D—the crude salt mix can be used "as is" or dissolved in the waste water used for compaction, E—after concentration by evaporation, or after dissolving the crude salts, chilling the solution selectively crystallizes sulfates (as complex hydrates of magnesium and sodium sulfate) and the percentage of sodium chloride in the remaining liquid is increased.

Sodium Sulfate for Control of the *Phymatotrichum Omnivorum*

This fungus attacks the roots of Dicots, the more notable being alfalfa, cotton, and citrus. Common names are "Cotton Root Rot" and "Texas Root Rot". The first task given (1886) to Texas Agricultural Experiment Station was to find a way to combat this root rot.

The incidence of root rot from East Texas to Indio, Calif., and from Las Vegas, Nev. south into Sinaloa, Mexico, impairs or totally ruins the productivity of millions of hectares of land that can be restored to production.

In the late 1960's Lyda found this to be caused by an excess of calcium carbonate where sodium ion is deficient. These soils do not swell enough to allow escape of carbon dioxide from decay of soil humus. The fungus requires more than about 3% $CO_2$ to start growth. Lyda used sodium chloride to add enough sodium ion increase soil swelling and a resultant increase in soil permeability to gases. This cured the root rot but the byproduct is calcium chloride which must drain for the desired plant growth. This drainage increases the chlorides in the groundwater and this practice is little used.

Sodium ions from sodium sulfate also increase soil swelling with the formation of a desirable product, gypsum, instead of the undesirable calcium chloride.

Further, the chloride content of sodium sulfate produced from irrigation waste waters can be reduced to a tolerable limit and the magnesium content, not tolerable in commercial sodium sulfate, is a necessary plant nutrient. Alfalfa suffers greatly from root rot but requires relatively large amounts of magnesium as a nutrient.

I have discovered that a cure for root rot results from simultaneous addition of magnesium sulfate nutrient in a completely soluble form as nutrients for soil amendments. Moreover, the magnesium and sulfates can be obtained through the purification of waste waters.

Sodium Sulfate for Water Softening

In the investigation of the possible uses of sodium sulfate recovered from wastes, I found an unusual and unexpected use in the recycling of water softening waste brines and oil field produced waters.

The addition of sodium carbonate for precipitation of both calcium and magnesium as carbonates is well known. But the precipitates are fine and will not settle leading to a need to provide seed crystals to get a settled product. The amount of handling has kept this practice from being adopted commercially.

The removal of calcium from brine by addition of sodium carbonate, and followed by the precipitation of magnesium with sodium hydroxide is well known. The large flakes of magnesium hydroxide aid in settling out the fine calcium carbonate. But this is effective for only the more dilute solutions. It has been demonstrated that, the hardness content of the spent brine must be limited to about 1000 grains, 17,000 ppm, or this floc will not settle to more than about 30% solids as the precipitates do not settle to a dense floc. Again, drying for disposal, and disposal itself, is very costly. Thus it would be ecologically desirable to have a means for reclaiming the spent brine from ion exchange processes whereby the wastes were more easily disposed of, and even more desirable to have a saleable product.

I have found that when sulfate ion is added to the waste water softener brine, the gypsum formed settles very well and can be separated and washed to make a fine grained gypsum, superior to mined gypsum in purity and in reactivity. The material color is light and bright and suitable for paper filler, filler for molded plastic items, and other similar uses.

Sodium sulfate is a good supply of the sulfate ion as it includes the sodium ion as a direct replacement for the calcium and in the exact amount needed for regenerating the softener resin of zeolite.

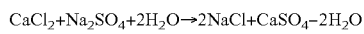
$$CaCl_2 + Na_2SO_4 + 2H_2O \rightarrow 2NaCl + CaSO_4 \cdot 2H_2O$$

Commercial grades of sodium sulfate are typically of high purity, 99+% sodium sulfate and low sodium chloride, typically 0.5% max of NaCl. This product works very well in precipitating calcium but is costly due to the amount of energy used in separation and purification.

Sodium sulfate recovered from waste is suitable even when the sodium chloride is too high to meet the usual commercial standards. The presence of sodium chloride in the sodium sulfate to be used for water softening is acceptable because sodium chloride is required for makeup of the regenerative solution. Where the water being softened is intended for applications other than potable water, say for industrial applications like cooling towers and once through boilers, the use of a less pure sodium sulfate derived from waste waters gives significant savings.

After settling of the gypsum, the magnesium is removed by precipitation and, after washing to remove the brine, the precipitated magnesium carbonate, or magnesium hydroxide, is suitable for use in many of the usual applications of magnesium carbonate, or magnesium hydroxide and/or, following calcination, as magnesium oxide.

Reclamation of domestic sewage for industrial use and for irrigating non-food plants is becoming increasingly important. Organizations such as California Water Reuse Association and many others note that domestic water softeners that use salt added at the home-add sodium chloride brine to the sewers.

Unwanted influences of sodium towards plant growth may be largely offset by additions of calcium. However, there is no presently known method for offsetting the effect of the chloride ion. Further, the sulfate ion content may be lowered by well known methods commonly used in water treatment while no such cost-effective methods are known for chloride ion. Thus, the substitution of a plant nutrient ion, such as the sulfate ion, for the harmful chloride ion, would be of benefit to the reuse of domestic sewage waters in irrigating plants.

I have found that it is possible to substitute commercial grades of sodium sulfate for the commercial grades of sodium chloride ordinarily used in sodium ion exchange water softening and thereby reduce the chloride ion in the waste brine down to the level that exists as an impurity in the sodium sulfate and water used for the regenerating brine.

Ordinarily the sulfate ion content in sodium chloride used for regeneration of ion-exchange softeners is limited. For example, the Specifications of American Water Works Association (AWWA) limit the sulfate ion content in the salt to a maximum of 1.4%, which, in a saturated brine of 26% salt, calculates to a maximum of 0.346% sulfate ion in the regeneration brine.

I have found that in using sodium sulfate regenerating brine, sulfate ion contents up to about 5% in the regenerating brine may be used for regeneration of resins and other media used in sodium ion exchange water softeners.

In this manner, the increase in chloride ion content is largely eliminated and the substituted sulfate ion is of beneficial use as a plant nutrient.

I have also found that sodium sulfate of the same usability for sodium ion exchange water softening as the above-mentioned commercial grades, can be produced from waste irrigation waters.

Salt for Rural Sanitation

A sample of the salt recovered from the Salton Sea was used to make a solution containing about 1% sodium chloride. This solution was used to make a weak, less than 1% chlorine, sodium hypochlorite bleach according to the method of Grott. Though undesirable impurities like boron are present, the percentages are so reduced according to the 2-5 ppm use of the chlorine in the bleach that using it for sanitation of water for cleaning of home surfaces, eating and cooking utensils, clothes and bedding is safe.

Do-it-Yourself Liquid Chlorine Bleach for Rural Sanitation

Much of the world's population depends on boiling to produce safe drinking water but the first utensil dipped into the cooled water may re-contaminate it, and the water will no longer be "safe to drink". Solar heat and other practices may also be used for killing parasites and germs but the problem of recontamination remains. Chlorine is the only practical means for extending the period of safety of the drinking water.

Many plants and vegetables must be cooked to prevent illness when they could be made safe to eat simply by washing with chlorinated water. Just like the drinking water, cooked foods, after cooling, can be recontaminated by use of serving utensils that were not sanitized.

In many places in Kenya, except for a few trees left for shade, the plains and hills have been stripped of trees and shrubs and wood must be carried for long distances.

Chlorine is a common agent for sanitizing water and residual chlorine adds a measure of lasting protection to the treated water. (Note of caution: chlorine does not kill parasites). Liquid chlorine bleach, sodium hypochlorite, is one material common in home use for supplying active chlorine.

Handling dilute bleach, even with chlorine concentrations below 1%, requires caution, eye protection is advised, and drinking the bleach itself is very dangerous. Use of bleach in sanitizing water containing organic materials is reported to increase the risk of cancer in humans by up to 10 chances per million.

The objective is to have equipment and operations requiring skills comparable with those of bicycle and auto mechanics, and to use commonly available materials to the full extent possible. Cell dimensions were matched to the capabilities of a 12-volt car battery. Sodium hypochlorite forms when salt water is electrolyzed using Direct Current (DC). The theoretical voltage drop across a single cell is below 3 volts but in operation it is about 3.3 to 4.0 volts depending on resistance losses in the wires and electrodes, the salt concentration and temperature of the solution, and the spacing of the electrodes. The 10-12 volt drop for a 3-cell electrolysis unit fits well with the 12 volt D.C. battery typically used in cars.

Car batteries are charged (recharged) using a source of DC power at about 14 volts. Battery chargers converting AC to DC are common, and there are also solar cell chargers. For a true "do-it-yourself" power unit we chose to use a car alternator, or generator, and to drive it by a Vee belt using the driving wheel on a bicycle. The rate of rotation of the bicycle wheel is matched to the characteristics of a particular alternator or generator. A typical alternator from a mid-sized American car will produce about 7 amperes at 1500 revolutions per minute (rpm) and the power output increases as the rpm are increased. The size of the pulley used on the alternator is chosen to meet the preference of the bicycler to produce the necessary 1500-2000 rpm. Charging to maintain battery capacity is usually carried out during the bleach making so as to avoid drawing the battery down below the full 12 volts operating capability.

Alternators required voltage regulation. They may have a built-in voltage regulator or they may require a separate one and it is necessary to know which design of alternator is being used. Generators require a separate voltage regulator. We find that producing the 7-10 amps at 14 volts common for battery chargers is well within the comfort range for even lightly built teenagers. They report that producing a charger output of 7-10 amperes feels comparable to pumping a bicycle on level pavement at about 12-15 miles per hour. Geared bicycle drives allow adjusting the pedaling rpm to an individual's comfort range. In the USA, the cost for all components, including a rebuilt alternator, a voltage regulator, Vee belt, and used bicycle components is on the order of $100-$150 per charging unit.

This "first generation" cell will serve to get the program started. Ingenuity and feedback from practitioners and interested volunteers will bring forth improvements and adaptations to better fit various local conditions. Full success of the program depends on these ideas from the field.

Graphite and/or titanium were chosen for the electrodes because of their known properties, availability, and acceptable costs. Commercial electrolysis units commonly use plated titanium to allow long use before maintenance or replacement is required. This extra expense for coating is not cost effective where labor costs are low and there is a need to minimize the cost of imports.

An assembly of four electrodes is clamped with the faces parallel. Plastic strips that do not conduct electricity, and about 2.5 wide×7.5 cm long×6 mm thick, are placed at the top of the electrode assembly to provide a 6 mm spacing between electrodes. A 3-cell unit with a voltage drop of 10-12 volts is formed by clamping 4 electrodes with faces parallel, and with a 6 mm spacing between the faces, as shown in the photo. Power is supplied only to the outside electrodes with the two inner electrodes providing two working surfaces each. If a coating forms on the electrodes, reversing the wires cleans the electrodes.

Electrode dimensions of 7.5 cm×15 cm were chosen to fit the power output ranges of different size batteries. For this assembly, the amperage required by the cell can be adjusted by the depth of immersion of the electrodes. Immersion to 7.5 cm in a 1% salt solution typically draws 9-11 amperes. Of course, changing the salt content of the solution also changes the electric characteristics of the system.

The container can be any glass or plastic. A 2-liter plastic soft drink bottle works well. A working capacity of about 1.5 liters is available when the bottle top is cut off just above the label. Active chlorine produced depends on the power source, the strength of the salt solution, and the electrode area submerged, as well as the length of the time period during which power is applied to the cell. The hourly chlorine production can be varied within the range of 600 parts per million (PPM) to 6000 PPM. Even the lower concentration is enough to sanitize and protect several hundred liters of drinking water. Experience with this simple unit has demonstrated that making usable solutions of bleach is well within the capability of persons having commonly available skills.

"Do-it-yourself" liquid chlorine bleach for sanitizing and/or protecting drinking water is made using salt, cells costing about $20.00 in US, and 12 Volt DC electric power from a car battery. Recharging may be by a battery charger, or solar cells, or a car alternator belt-driven by a bicycle wheel.

In the USA, household bleach is sold and used at strength of 5.5% chlorine. It is used by a great many people of all educational levels, in large quantities, and one rarely hears of accidents damaging to users or their children. The bleach generated in the cells described herein is usually only a tenth to a hundredth of this strength.

For use in sanitizing water, instrumentation for testing for residual chlorine is of great help. In the absence of such instrumentation and skills, another way is available. The US Navy has used bleach on ships for many years and much information is available on the Internet. For water sanitation, one typically adds so many drops of bleach to a gallon of water, waits 30 minutes, and smells the water. If the bleach is detectable by smell, then there is enough residual chlorine that bacteria in the water were killed. (But not parasites which must be filtered out or killed by pasteurization or boiling.) If the smell is too strong, dilute the treated water by a measured amount, mix, wait 30 minutes, and try the smell again. If there is no chlorine smell, add another measured amount of the bleach, mix, wait another 30 minutes, and smell again.

This trial procedure establishes a safe level by experience without the use of instrumentation or test kits, and even when the initial strength of the bleach is not known. It is tedious and boring at any time and can be very irritating if one is thirsty, but it works. When, after that 30-minute wait period, the residual chlorine is detected by smell, then there is enough residual chlorine to give all of the benefits possible.

For removal of parasites, building and using slow sand filtration units is well within the skills of at least some inhabitants of most villages. Demonstrating and teaching slow sand filtration presents a further opportunity for "teaching a person to fish".

"Do-It-Yourself" bleach making offers an opportunity to persons who want to have more control over their health. Success with increasing the safety of their drinking water will give them an accomplishment of which they can be proud and the success will increase their desire and skills for learning more about how to help themselves.

Caustic Soda from Slacked Lime and Sodium Sulfate $Ca(OH)_2$ solids of low solubility+$(Na_2SO_4)$ in solution à 2 $NaOH$+$CaSO_4$ solids of low solubility. Alternately, the sodium sulfate can be as the decahydrate.

Caustic is produced primarily as a co-product with chlorine by electrolysis of sodium chloride. Recent prices of caustic are very high because of reduced demand for chlorine. Further, there are environmental pressures to further reduce the use of chlorine. It would be advantageous to have a supply of caustic independent of the demand for chlorine.

The reaction of slaked lime with sodium sulfate to form caustic soda and calcium sulfate is well known but is rarely practiced because of low yield and the weak solutions of caustic that are formed.

I have found that the yield and rate of reaction may be significantly increased by using extreme abrasive and grinding pressures to remove the coating of calcium sulfate that forms on the lime to reduce reaction rates and decrease yields.

Further, the concentration of the caustic soda is increased and un-reacted sodium sulfate is crystallized by evaporation of the solution, and recycled. In a second instance the evaporation is by solar evaporation.

Having described the invention in such terms as to enable one skilled in the art to make and use it and having identified the presently best mode of practicing it, I claim:

1. A method of improving oil or gas well production comprising the steps in combination of:
    (a) collecting contaminated water having 0.15% or more by weight of the salts of Na, Ca, Mg, K, Cl, $SO_4$ or $CO_3$ or combinations thereof;
    (b) separation processing said contaminated water to produce
        a first separated liquid product having increased sodium chloride and decreased magnesium chloride and calcium chloride or combinations thereof than the collected water; and
        a second solid or liquid product having decreased sodium chloride and increased magnesium chloride and calcium chloride or combinations thereof than the collected water; and
    (c) injecting said first liquid product into an oil or gas well formation to improve production.

2. The method of claim 1 wherein the contaminated water is collected from an oil or gas well.

3. The method of claim 1 further comprising the step of processing the first liquid product by electrolysis.

4. The method of claim 3 wherein said first liquid product injected into the oil or gas formation comprises NaOCl.

5. The method of claim 3 wherein the contaminated water is collected from an oil or gas well.

6. The method of claim 4 wherein the contaminated water is collected from an oil or gas well.

7. The method of claim 1 further comprising the step of adding oil recovery chemicals to the first liquid product prior to injecting the first liquid product into the oil or gas well formation.

\* \* \* \* \*